(12) United States Patent
Berliner et al.

(10) Patent No.: US 11,290,170 B1
(45) Date of Patent: Mar. 29, 2022

(54) SUB-TERAHERTZ SUB-BAND FLATTENING FEEDBACK

(71) Applicant: QUALCOMM Incorporated, San Diego, CA (US)

(72) Inventors: Ran Berliner, Kfar-Aviv (IL); Shay Landis, Hod Hasharon (IL); Yehonatan Dallal, Kfar Saba (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/089,511

(22) Filed: Nov. 4, 2020

(51) Int. Cl.
*H04W 24/10* (2009.01)
*H04B 7/06* (2006.01)
*H04L 5/00* (2006.01)
*H04B 7/0456* (2017.01)

(52) U.S. Cl.
CPC ......... *H04B 7/0639* (2013.01); *H04B 7/0456* (2013.01); *H04B 7/0626* (2013.01); *H04L 5/0048* (2013.01); *H04W 24/10* (2013.01)

(58) Field of Classification Search
CPC .. H04B 7/0456; H04B 7/0617; H04B 7/0626; H04B 7/0417; H04B 7/0478; H04B 7/0469; H04B 7/0639; H04B 7/0632; H04B 7/0413; H04B 7/046; H04B 7/0634; H04B 7/0452; H04L 5/0023; H04L 25/03942; H04L 5/0048; H04L 1/005; H04L 5/0053; H04L 5/0007; H04L 1/0003; H04L 1/0643; H04L 25/03343; H04L 27/2602; H04L 5/0051; H04W 24/10; H04W 72/0413; H04W 88/02; H04W 52/242; H04W 72/06; H04W 88/08; H04W 52/146; H04W 24/08; H04W 52/50; H04W 72/0406; H04W 24/02; H04W 52/325; H04W 74/0833
USPC ................... 375/267, 296; 455/450; 370/252
See application file for complete search history.

(56) References Cited

U.S. PATENT DOCUMENTS

| | | | | |
|---|---|---|---|---|
| 2009/0111475 A1* | 4/2009 | Yang | ...................... | H04L 1/0029 455/450 |
| 2009/0116581 A1* | 5/2009 | Liau | ...................... | H04L 25/022 375/296 |
| 2012/0082049 A1* | 4/2012 | Chen | ...................... | H04L 43/06 370/252 |
| 2021/0184742 A1* | 6/2021 | Gao | ...................... | H04L 5/0091 |

OTHER PUBLICATIONS

3GPP: "3rd Generation Partnership Project, Technical Specification Group Radio Access Network, NR, Physical Layer Procedures for Data (Release 16)", 3GPP TS 38 214, V16.3.0, Sep. 2020, 36 Pages.

* cited by examiner

*Primary Examiner* — Eva Y Puente
(74) *Attorney, Agent, or Firm* — Procopio, Cory, Hargreaves & Savitch LLP

(57) ABSTRACT

Aspects presented herein may enable a receiving device to receive high frequency signals with a simpler receiver to reduce the overall complexity and cost associated with the receiver. In one aspect, an apparatus receives a reference signal from a second wireless device. The apparatus measures amplitude and phase of the reference signal relative to a set point. The apparatus transmits channel flattening information in a precoding feedback to the second wireless device, the precoding feedback including at least a difference between the amplitude of the reference signal and the set point for a sub-band.

79 Claims, 17 Drawing Sheets

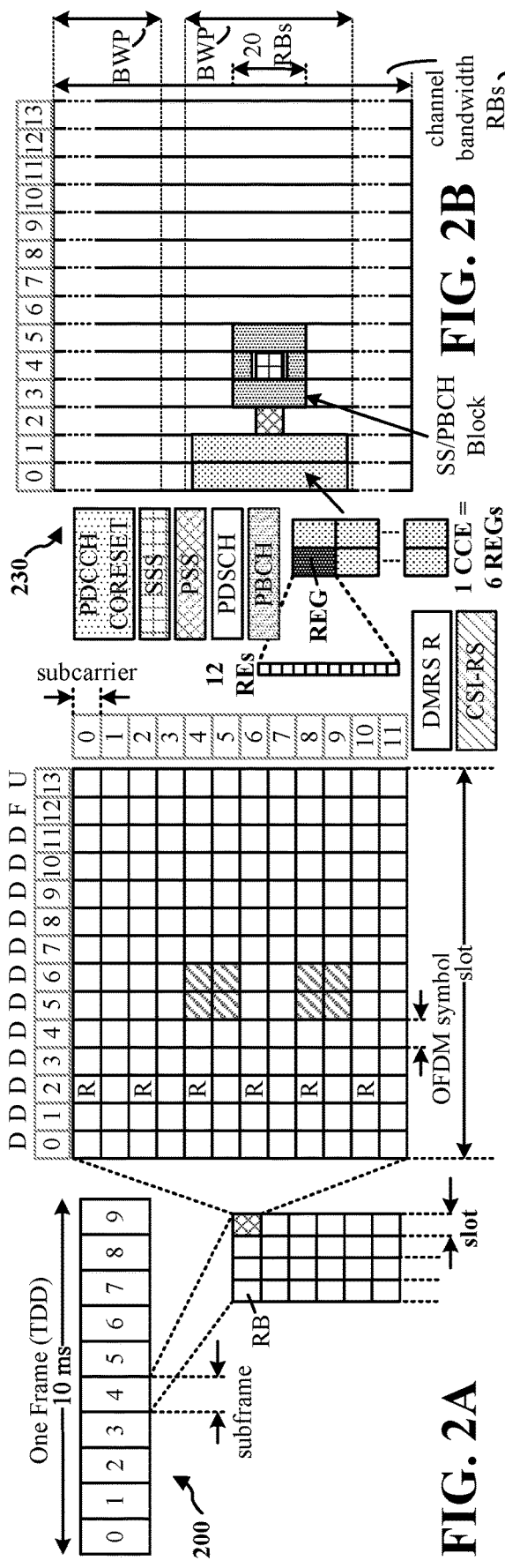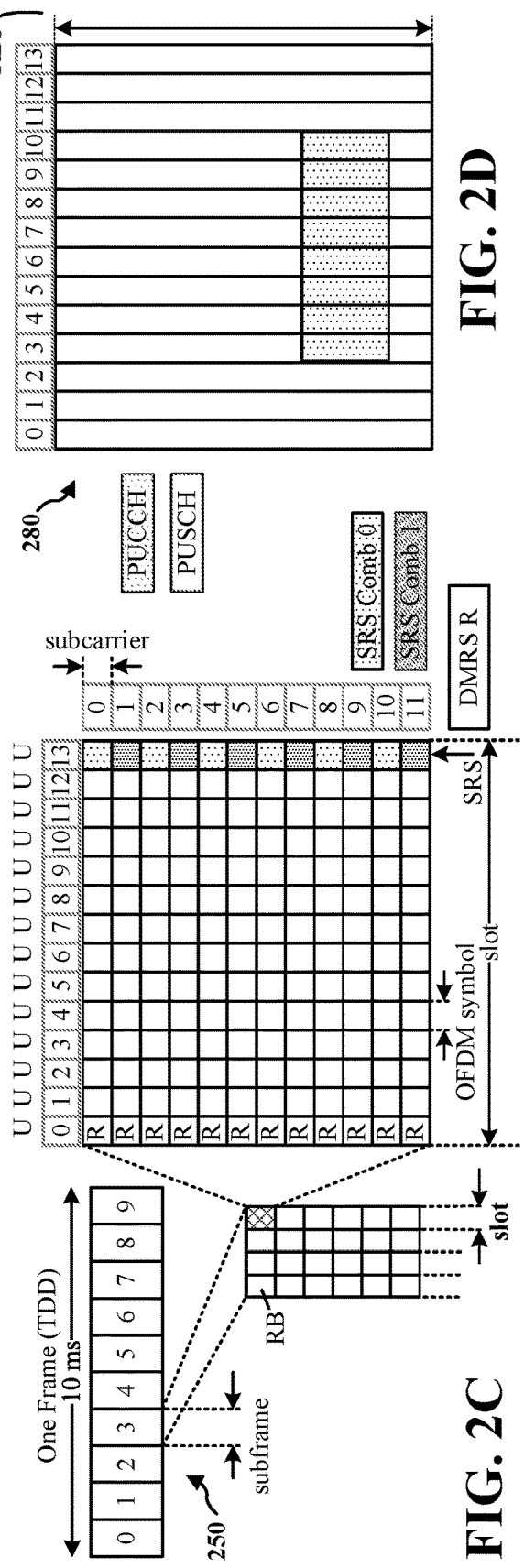
FIG. 2A  FIG. 2B  FIG. 2C  FIG. 2D

SUB-TERAHERTZ SUB-BAND FLATTENING FEEDBACK

INTRODUCTION

The present disclosure relates generally to communication systems, and more particularly, to wireless communication involving sub-band flattening.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus is provided for wireless communication. The apparatus includes memory and at least one processor coupled to the memory, the memory and the at least one processor being configured to receive a reference signal from a second wireless device, measure amplitude and phase of the reference signal relative to a set point, and transmit channel flattening information in a precoding feedback to the second wireless device, the precoding feedback including at least a difference between the amplitude of the reference signal and the set point for a sub-band.

In another aspect of the disclosure, a method is provided for wireless communication at a first wireless device. The method includes receiving a reference signal from a second wireless device; measuring amplitude and phase of the reference signal relative to a set point; and transmitting channel flattening information in a precoding feedback to the second wireless device, the precoding feedback including at least a difference between the amplitude of the reference signal and the set point for a sub-band.

In another aspect of the disclosure, an apparatus is provided for wireless communication. The apparatus includes means for receiving a reference signal from a second wireless device; means for measuring amplitude and phase of the reference signal relative to a set point; and means for transmitting channel flattening information in a precoding feedback to the second wireless device, the precoding feedback including at least a difference between the amplitude of the reference signal and the set point for a sub-band.

In another aspect of the disclosure, a non-transitory computer-readable medium is provided for wireless communication at a first wireless device. The computer-readable medium includes code to receive a reference signal from a second wireless device; measure amplitude and phase of the reference signal relative to a set point; and transmit channel flattening information in a precoding feedback to the second wireless device, the precoding feedback including at least a difference between the amplitude of the reference signal and the set point for a sub-band.

In an aspect of the disclosure, an apparatus is provided for wireless communication. The apparatus includes memory and at least one processor, the memory and at least one processor are configured to transmit a reference signal to a second wireless device; receive channel flattening information in a precoding feedback from the second wireless device, the precoding feedback including at least a difference between an amplitude of the reference signal and a set point for a sub-band; and apply the precoding feedback to a signal for transmitting one or more data to the second wireless device. The apparatus may also transmit the one or more data to the second wireless device.

In another aspect of the disclosure, a method is provided for wireless communication at a first wireless device. The method includes transmitting a reference signal to a second wireless device; receiving channel flattening information in a precoding feedback from the second wireless device, the precoding feedback includes at least a difference between an amplitude of the reference signal and a set point for a sub-band; and applying the precoding feedback to a signal for transmitting one or more data to the second wireless device. The method may also include transmitting the one or more data to the second wireless device.

In another aspect of the disclosure, an apparatus is provided for wireless communication. The apparatus includes means for transmitting a reference signal to a second wireless device; means for receiving channel flattening information in a precoding feedback from the second wireless device, the precoding feedback includes at least a difference between an amplitude of the reference signal and a set point for a sub-band; and means for applying the precoding feedback to a signal for transmitting one or more data to the second wireless device. The apparatus may also include means for transmitting the one or more data to the second wireless device.

In another aspect of the disclosure, a non-transitory computer-readable medium is provided for wireless communication at a first wireless device. The computer-readable medium includes code to transmit a reference signal to a second wireless device; receive channel flattening information in a precoding feedback from the second wireless device, the precoding feedback includes at least a difference between an amplitude of the reference signal and a set point for a sub-band; and apply the precoding feedback to a signal for transmitting one or more data to the second wireless device. The apparatus may also transmit the one or more data to the second wireless device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
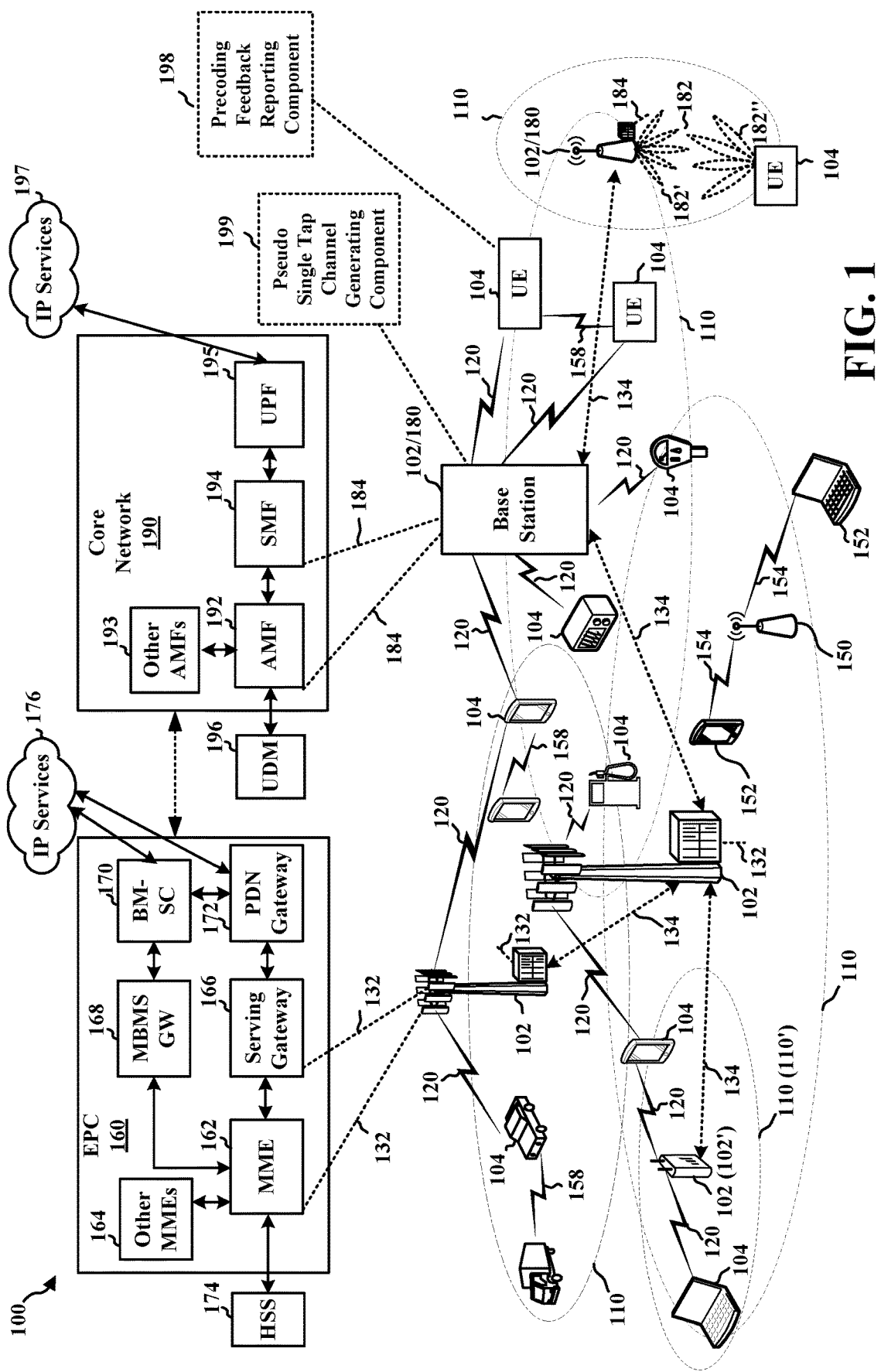
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Wireless devices, such as a base station and UEs, may communicate with each other through beamforming techniques to increase communication speed and reliability. The beamforming techniques may enable a wireless device to transmit a signal towards a particular direction instead of transmitting an omnidirectional signal in all directions. In some examples, the wireless device may transmit a signal from multiple antennas using a common wavelength and phase for the transmission from the multiple antennas, and the signal from the multiple antennas may be combined to create a combined signal with a longer range and more directed beam. The beamwidth of the signal may vary based on the transmitting frequency. For example, the width of a beam may be inversely related to the frequency, where the beamwidth may decrease as the transmitting frequency increases because more radiating elements may be placed per given area at a transmitter due to smaller wavelength.

A signal transmitted using a narrower beam may have less distortions due to less reflections or refractions under a line of sight condition compared to a signal transmitted using a wider beam. For example, a signal transmitted at a very high frequency and in a very narrow beam, such as a narrow beam formed within the sub-THz frequency range, may have a single lobe with very little or no fluctuations when the signal reaches the receiving device. Such signals, without many fluctuations, may be processed by lower complexity receiver components. For example, higher complexity receiver components may include equalizers that may be used for equalizing signals (e.g., reversing the distortion incurred by signals during transmission) received from wider beams, and lower complexity receivers may process the signal without equalizers. In one example, higher complexity receivers may be impractical for wide bandwidth carriers (e.g., carriers with large bandwidth such as 1000 MHz per carrier or above) due to wide carriers' larger fast-Fourier transform sizes. A lower complexity receiver may include few components, or less complex components, which may provide for manufacturing savings and efficiency.

A frequency selective signal (e.g., amplitude of the signal fluctuates over a frequency domain) may be flattened through compensating and/or attenuating the signal to provide a more consistent amplitude across the frequencies of the signal, such as by applying zero-forcing equalization to the frequency selective signal. If frequency selective signals are converted/tuned into signals with consistent amplitudes in the frequency domain, a receiving device may be able to receive these signals using a lower complexity receiver. For example, a lower complexity receiver having an equalizer with a single delay element and/or a receiver configured to receive the signal from a single path may be more suitable and cost-efficient for receiving signals with consistent amplitudes in the frequency domain. The equalizer with a single delay element and/or a receiver receiving a signal from a single path may be referred to as a "single tap receiver" and/or a "single tap equalizer." The term "tap" in this context may refer to a point on a delay line that corresponds to a certain delay in an equalizer. A tap may also be a delay element or includes a delay element within the equalizer. For a channel that introduces just a delay and an attenuation to the transmitted signal without being frequency selective, the transmitted signal may be restored and compensated using the single tap receiver. The channel that introduces a delay and an attenuation to the transmitted signal may also be referred to as a "single tap channel," and the single tap channel may be a flat channel over time domain. As the single tap receiver may have less components and use lower complexity algorithm to equalize the received signal, the single tap receiver may be relatively cheaper to manufacture and implement compared to the high complexity equalizers. Thus, according to one or more examples, if wireless devices are able to communicate in a single tap channel, the wireless devices may use single tap receivers to receive the signals, which may reduce the cost, power and/or the die size for the receivers of the wireless devices. As noted above, the less complex receiver may process the signal without complex equalizers. In other words, if a received channel is of a single tap (e.g., the received channel is able to process an incoming signal with a single tap receiver), a receiving device may process signals received from the channel with a lower complexity receiver.

Aspects presented herein may enable a receiving device, such as a UE, to receive high frequency signals (e.g., signals within THz and/or sub-THz frequency range) using a lower complexity receiver, such as a single tap receiver (e.g., a receiver/equalizer with a single delay element and/or receives a signal from single path), to reduce the overall complexity and cost associated with the receiver. A receiving device may transmit a precoding feedback that includes channel flattening information (e.g., information that may be used for flattening a signal to provide a more consistent amplitude across the frequency of the signal) to a transmitting device, such as a base station. Based on the precoding feedback or the channel flattening information, the transmitting device may create a pseudo single tap channel (e.g., a channel that resembles one or more characteristics of a single tap channel) for transmitting data. In other words, the transmitting device may apply attenuation or compensation to a transmitting signal based on the precoding feedback, such that the receiving device may receive the signal that has the same or similar amplitude across the frequency domain (e.g., the amplitude may be substantially constant). For example, a signal with uniform amplitude across the frequency domain may be received using a single tap receiver because the signal may include an attenuation and a delay that may be compensated or restored by the single tap receiver. The single tap receiver may be relatively low in cost and consume less power compared to a receiver that uses an equalizer with high complexity. In one or more examples, aspects presented herein (e.g., the disclosed precoding method) may be more suitable for communications in a high frequency beamformed environment, and it may leverage the resultant single tap channel as a design consideration for low complexity high frequency receivers as single tap receivers may be used by wireless devices for receiving signals.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include a precoding feedback reporting component 198 configured to transmit a sub-band precoding feedback report that contains coefficients for flattening one or more channel frequency responses of an occupied bandwidth. In one aspect, the precoding feedback reporting component 198 may be configured to receive a reference signal from a second wireless device. The precoding feedback reporting component 198 may further be configured to measure amplitude and phase of the reference signal relative to a set point. The precoding feedback reporting component 198 may further be configured to transmit channel flattening information in a precoding feedback to the second wireless device, the precoding feedback including at least a difference between the amplitude of the reference signal and the set point for a sub-band.

In certain aspects, the base station 102/180 may include a pseudo single tap channel generating component 199 configured to generate a pseudo single tap channel based on one or more coefficients received from a receiving device. In one aspect, the pseudo single tap channel generating component 199 may be configured to transmit a reference signal to a second wireless device. The pseudo single tap channel generating component 199 may further be configured to receive channel flattening information in a precoding feedback from the second wireless device, the precoding feedback includes at least a difference between an amplitude of the reference signal and a set point for a sub-band. The pseudo single tap channel generating component 199 may further be configured to apply the precoding feedback to a signal for transmitting one or more data to the second wireless device. The pseudo single tap channel generating component 199 may further be configured to transmit the one or more data to the second wireless device.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5GNR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. In some examples, the base station 102 or 180 and the UE 104 may exchange communication in a sub-THz frequency range. As an example, the frequency range may include a 140 GHz frequency. In some examples, the communication may be in frequency range 4 (FR4) or frequency range 5 (FR5), for example. In some examples, the frequency range may include a frequency range within at least a portion of 140 GHz to 300 GHz, for example. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots.

Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
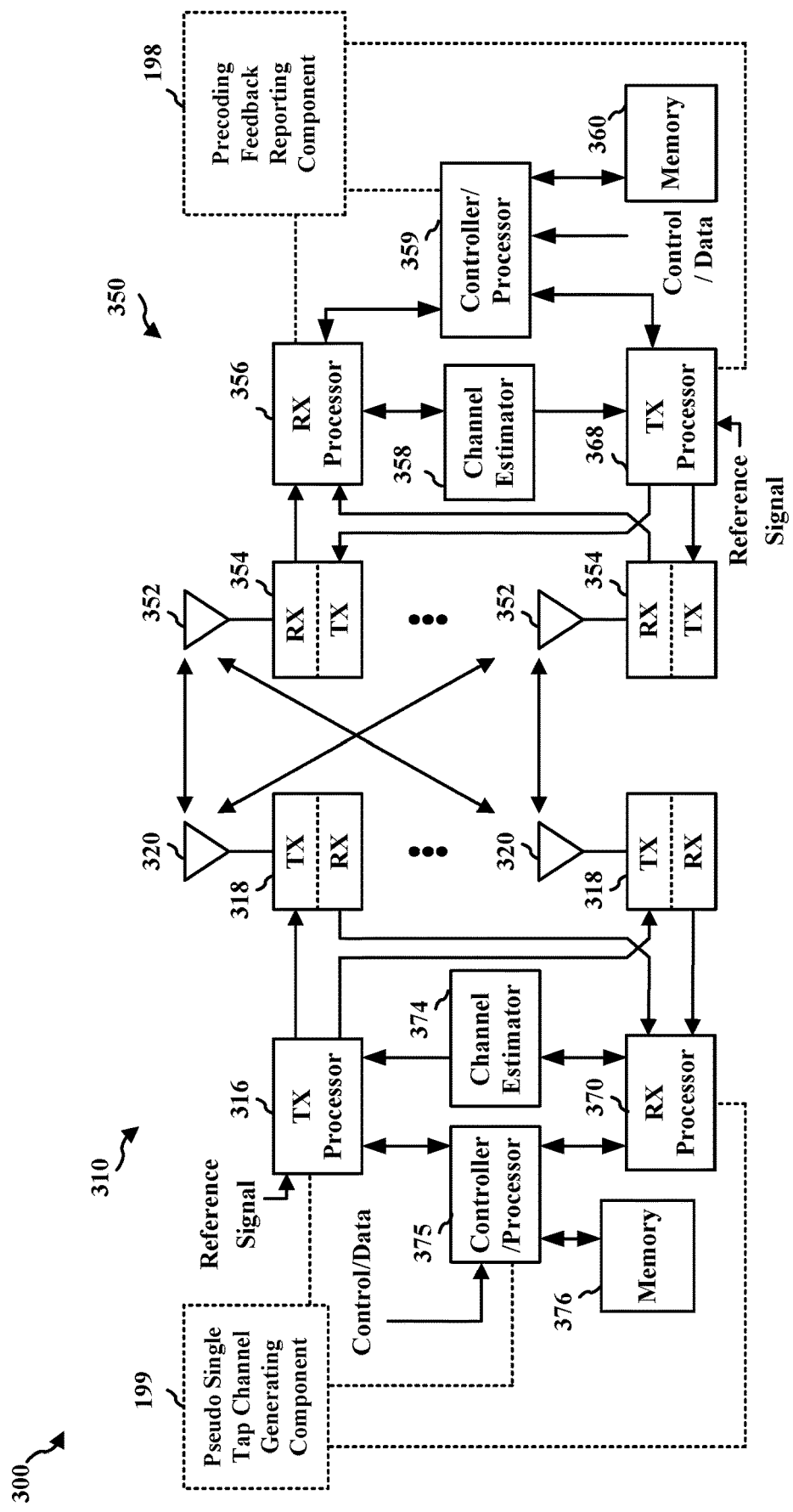
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the precoding feedback reporting component 198 of FIG. 1 to transmit a sub-band precoding feedback report that contains coefficients for flattening one or more channel frequency responses of an occupied bandwidth.

At least one of the TX processor 316, the RX processor 370, and the controller/processor 375 may be configured to perform aspects in connection with the pseudo single tap channel generating component 199 of FIG. 1 to generate a pseudo single tap channel based on one or more coefficients received from a receiving device.

Figure 4:
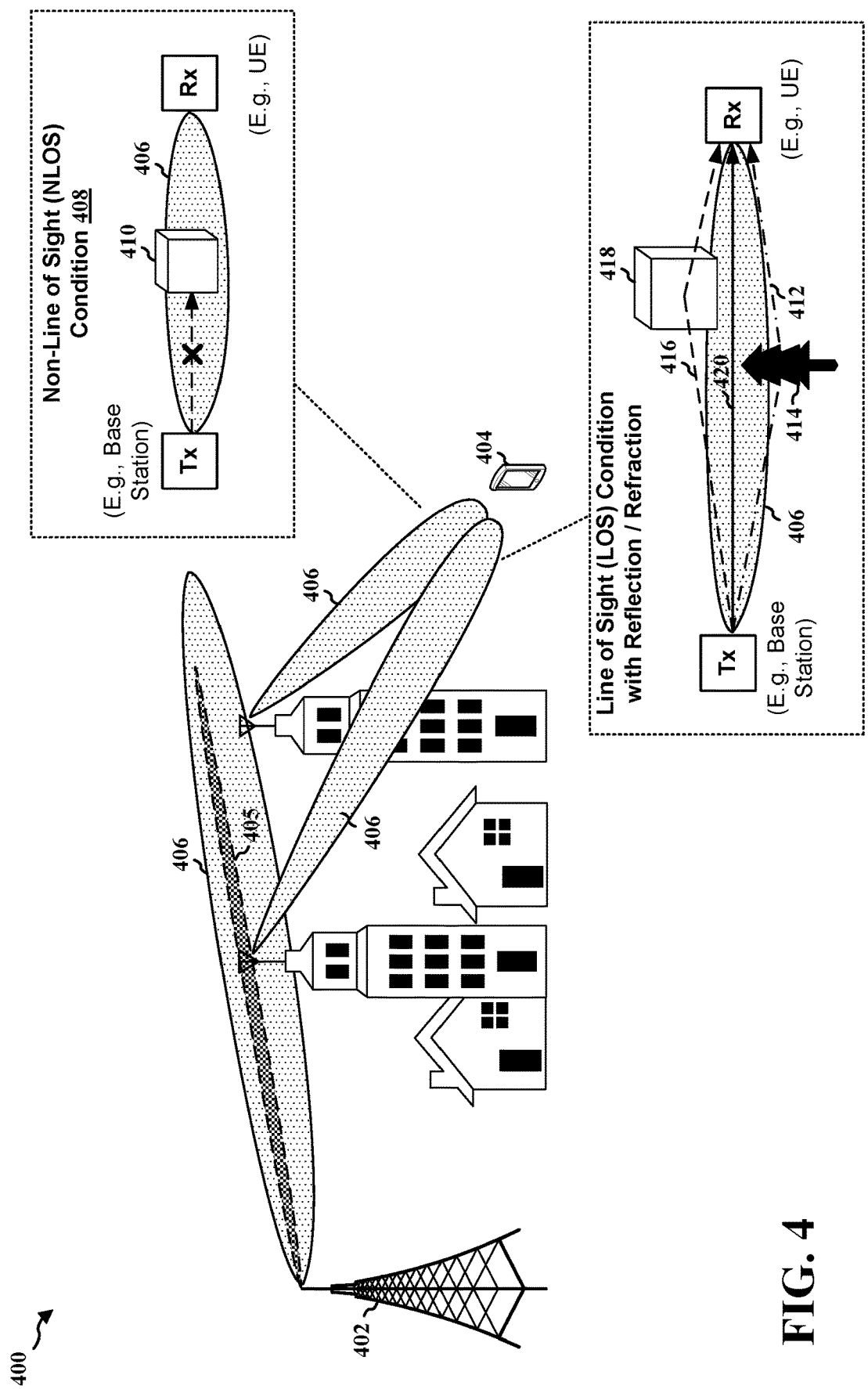
FIG. 4 is a diagram illustrating an example communication involving wide beams.

FIG. 4 is a diagram illustrating an example communication system 400 involving wide beam communication. The communication system 400 includes wireless devices, such as a base station 402 and a UE 404, which may communicate with each other or with other base stations and/or devices using wide beams 406. For example, wide beams 406 may include beams that are wider than a narrow beam 405, which is described in connection with 706 of FIG. 7A. In some examples, the wider beam (e.g., 406) in FIG. 4 may be a beam used for mmW communication, and the narrower beam of FIG. 7A (e.g., 706) may have a beamwidth that is a fraction of a beamwidth used for mmW communication, e.g. by having larger number of radiating elements in the same antenna aperture. Thus, for purpose of the present disclosure, the term "wide beam" or "wider beam" may refer to a beam that is relatively wider (has a larger beamwidth) compared to a narrow beam or a narrower beam, such as the narrow beam 406 or narrow beams 706 of FIG. 7A.

As shown by FIG. 4, a transmission through the wide beams 406 may be more likely to encounter non-line-of-sight (NLOS) conditions 408 where an object 410 (e.g., a building, a tree, etc.) may obstruct or may be within the transmission path of the wide beams 406. The wide beams 406 may also be more like to encounter reflection(s), such as shown by a path 412 from a transmitter Tx (e.g., the base station 402) to a receiver Rx (e.g., the UE 404) where the signal in one or more traveling paths may bounce off an object 414 before reaching the receiver, and/or to encounter refraction(s), such as shown by a path 416 where the direction of the signal in one or more traveling paths may change as it passes through a medium 418 (e.g., a material or an object in which the signal is able to pass/penetrate through) before reaching the receiver. The NLOS condition 408, reflection and/or refraction may cause the receiver to receive the signal from multiple paths with different angles and/or time due to the wider transmission path (or multiple transmission paths) of the wide beams 406, and the received signal may also be more likely to have distortions. For example, when a signal is transmitted from a transmitter to a receiver in multiple paths (e.g., in a frequency selective channel), the same signal may reach the receiver from multiple directions with different delays. For example, signals traveling through the path 412 and the path 416 may reach the receiver later than a signal that travels through a path (e.g., the path 420) that does not encounter any reflection or refraction. The receiver may include an equalizer with multiple taps (e.g., a multi-tap receiver) that are configured to process signals traveling through multiple paths with different delays, where each tap may correspond to a path and process the delay for the signal traveling through that path. The signal from each tap may then be combined/mixed into one signal. For example, the equalizer 600 in FIG. 6 may be referred to as a "four-tap equalizer" or a "four-tap receiver" which provides a delay line with four taps. A tap in this context may refer to a point on a delay line that corresponds to a certain delay. A tap may also be a delay element or includes a delay element.

Figure 5:
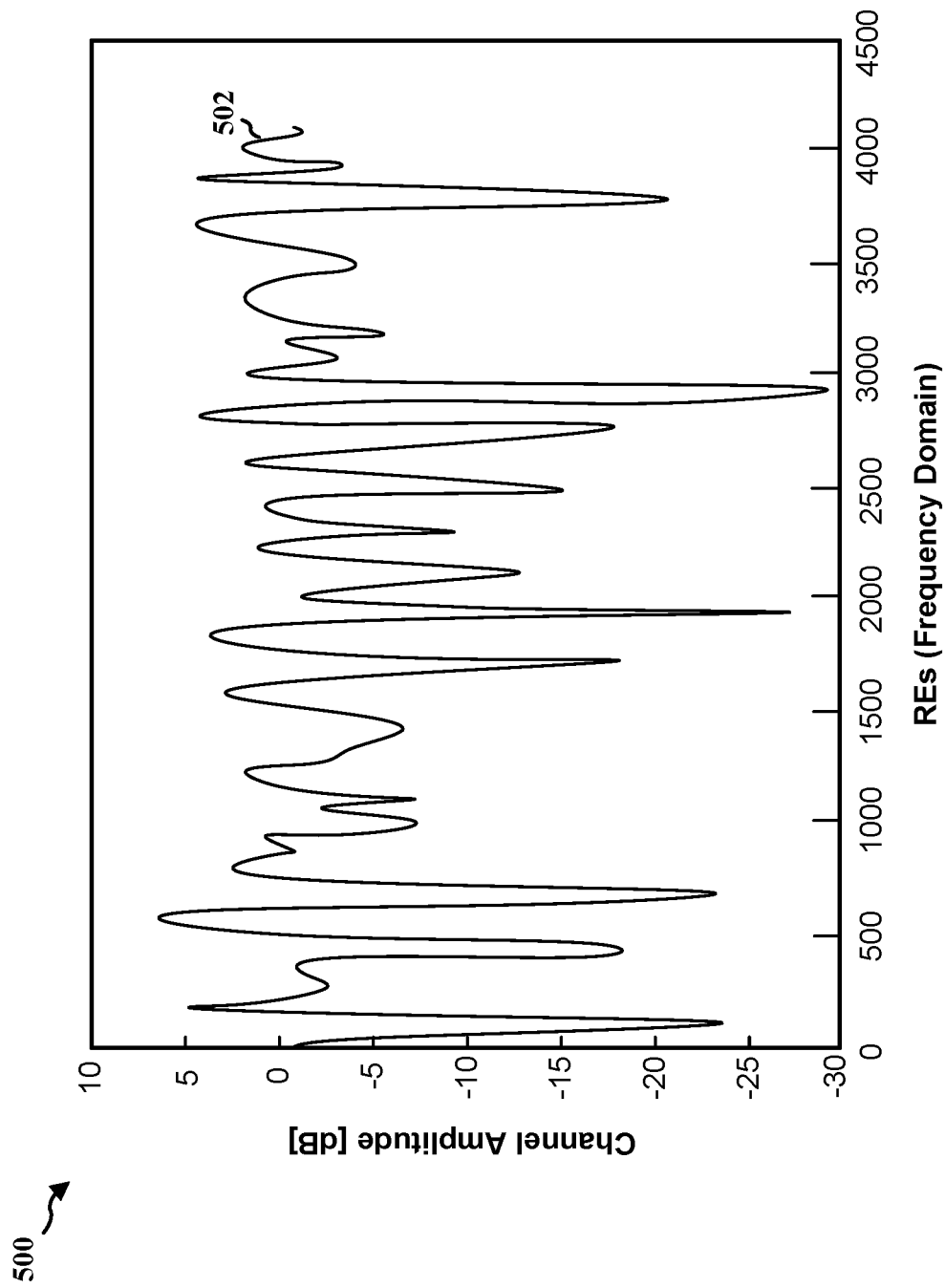
FIG. 5 is a diagram illustrating an example of a signal received/observed by a receiving device from a wide beam.

FIG. 5 is a diagram 500 illustrating an example of a signal that may be received/observed by a receiving device (e.g., the UE 404) from a wide beam (e.g., the wide beams 406), where the signal may be transmitted by a transmitting device (e.g., the base station 402). As a transmission through a wide beam may encounter more reflections, refractions and/or NLOS conditions due to a wider transmission path, a signal transmitted using a wide beam is more likely to have more fluctuations which is at least in part caused by the distortions, such as shown by the waveform 502 in diagram 500 where the received signal fluctuates up and down throughout the frequency domain. In addition, wide beams are more likely to be used in association with a wideband multipath channel or a frequency selective channel, where a signal transmitted from a wide beam may reach the receiving device by two or more paths. Thus, the communication channel (e.g., the frequency selective channel) may have a frequency response that varies across the system bandwidth (i.e., non-flat waveform with fluctuations).

When a receiving device receives a signal with distortions, the receiving device may use an equalizer to equalize the received signal. The equalizer may restore or reverse the distortions incurred by a signal transmitted through a communication channel, such that the transmitted information (e.g., the original signal waveform) may be reproduced at the receiving device. In other words, equalization may reverse the distortion incurred by a signal transmitted through a channel.

Figure 6:
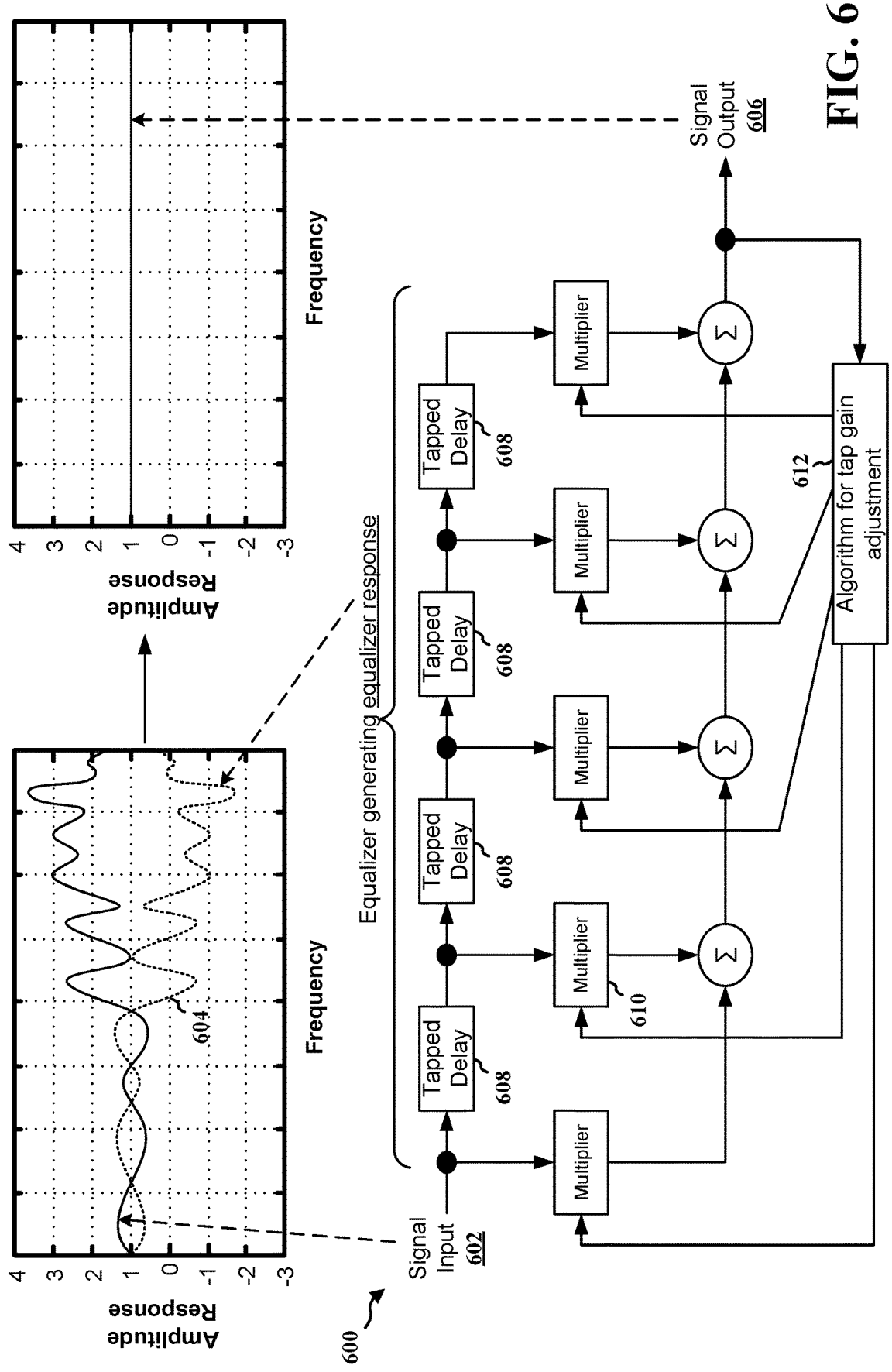
FIG. 6 is a diagram illustrating an example equalizer.

FIG. 6 is a diagram illustrating an example equalizer 600. The equalizer 600 may equalize a distorted input signal 602 (e.g., an unequalized input signal) by applying an inverse 604 of the input signal 602 to compensate the amplitude and/or the phase of the input signal 602. After amplitude and/or phase distortions are compensated, a resulting signal output 606 (e.g., an equalized output signal) may include a flat amplitude frequency response with a linear phase. The equalizer 600 may include a plurality of delay elements 608, where each delay element or a combination of delay elements may be referred to as a "tap." The equalizer 600 may also include a plurality of multipliers 610 that set gain for the plurality of delay elements 608 based on equalization coefficients that may be calculated based on an algorithm or an algorithm component 612. The combination of the delay elements 608, the multipliers 610 and/or the algorithm component 612 may enable the equalizer 600 to create a digital filter with essentially the opposite frequency response of a distorted channel. As the equalizer's frequency response is essentially a mirror image of the distorted channel's frequency response, the equalizer 600 may use the opposite frequency response to restore the transmitted signal.

An equalizer may equalize a distorted signal in real-time (e.g., on the fly). When an input signal or a communication channel contains many distortions, such as illustrated by the waveform 502 in diagram 500 of FIG. 5, the equalizer may implement or use more sophisticate algorithm, additional delay components and/or multipliers to equalize the input signal, e.g., to create an inverse of the input signal within short duration. Thus, the complexity of the equalizer may increase when the signal to be processed has many distortions and fluctuates. An equalizer with higher complexity (e.g., a high complexity equalizer) may be more expensive to manufacture than a lower complexity equalizer, e.g., an equalizer with less delay elements and multipliers, and/or lower complexity algorithms, etc. which is expected to process signals that do not contain many distortions.

Figure 7A:
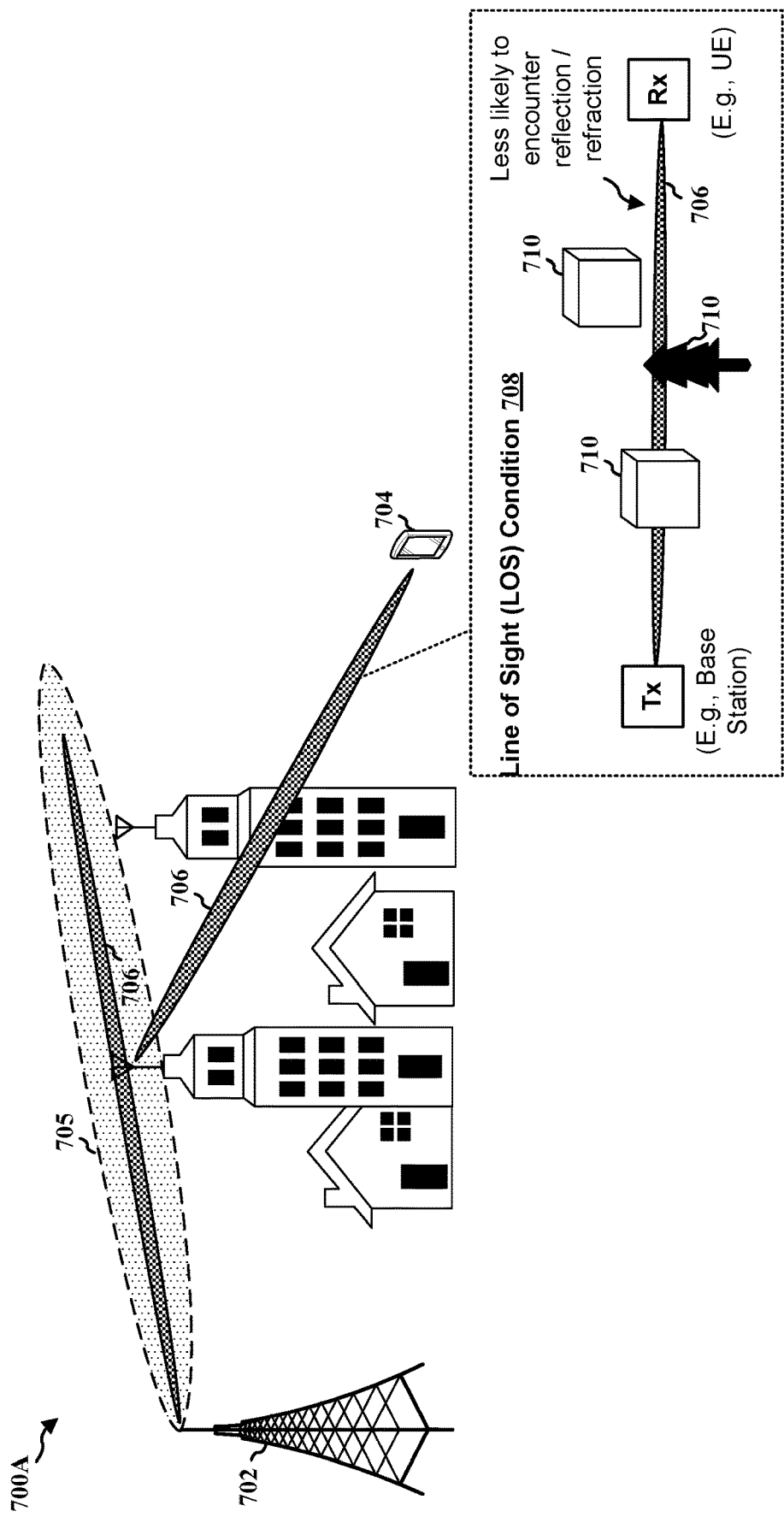
FIG. 7A is a diagram illustrating an example of communication involving narrow beams.

FIG. 7A is a diagram 700A illustrating an example communication involving narrow beams, where wireless devices, such as a base station 702 and a UE 704, may communicate with each other or with other base stations and/or devices using narrow (or narrower) beams 706. For purpose of the present disclosure, the term "narrow beam" or "narrower beam" may refer to a beam that is relatively narrower (has a smaller beamwidth) compared to a wide beam or another beam, such as a wide beam 705 which is described in connection with the wide beams 406 of FIG. 4. For example, the narrower beam may have a fraction (e.g., 5%, 15%, 25%, 35%, 50%, 70%, etc.) of a beamwidth used for mmW communication. In one example, the narrower beams may be formed at high frequencies, such as within sub-THz frequency range, such that the narrower beams may be used for sub-THz communication. As shown by FIG. 7A, the transmission path of the narrow beams 706 may be more likely to be narrowly tailored to the receiver. Thus, the transmission may be more likely to meet line-of-sight (LOS)

conditions 708 as the narrow beams 706 are more likely to reach the receiver without being obstructed by obstacle(s) (e.g., 710). As the transmission path is narrow, reflection and/or refraction are also less likely to occur for narrow beams 706.

Figure 7B:
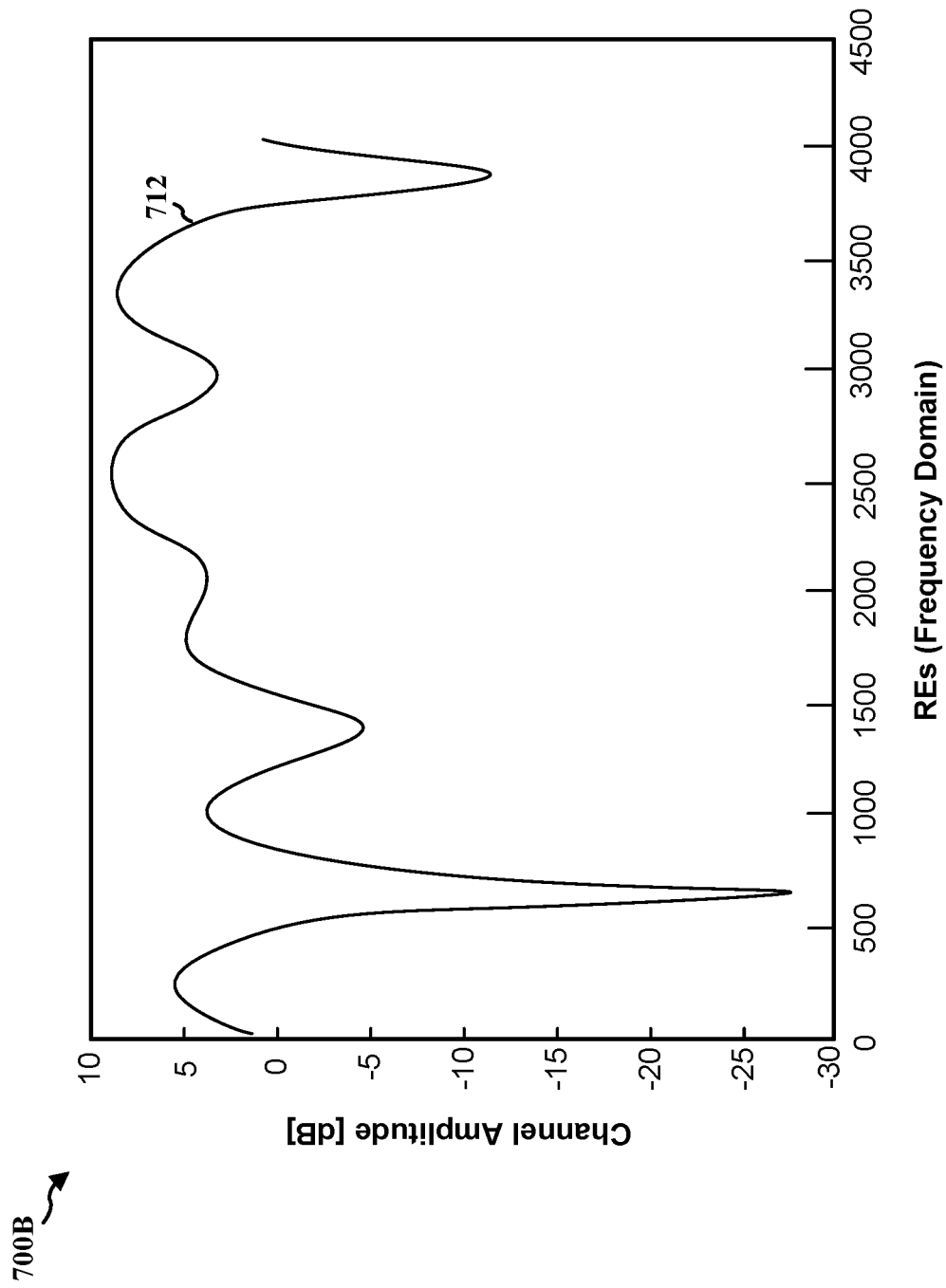
FIG. 7B is a diagram illustrating an example of a signal received/observed by a receiving device from a narrow beam.

FIG. 7B is a diagram 700B illustrating an example of a signal received/observed by a receiving device (e.g., the UE 704) from a narrow beam (e.g., the narrow beams 706), where the signal may be transmitted by a transmitting device (e.g., the base station 702). Different from the wider beams illustrated in FIG. 4, as a narrow beam may encounter less reflections or refractions during the transmission due to a narrower transmission path, a signal transmitted using a narrow beam may have less distortions compared to the signal transmitted using a wide beam, such as illustrated by the waveform 712 in diagram 700B of FIG. 7B.

As wireless technology continues to grow, demand may arise for spectrum in still higher frequency bands above the frequency range 2 (FR2) (e.g., 24.25 GHz-52.6 GHz), including in the sub-Terahertz (sub-THz) bands above 140 GHz or between 300 GHz and 3 THz, etc. The sub-THz frequency range radio technology may enable much narrower beam structures (e.g., pencil beams, laser beams, etc.) compared to the beam structures under the FR2 or below because more radiating elements may be placed per given area at the antenna due to smaller wavelength. The sub-THz frequency range may have short delay spread (e.g., few nanoseconds) and may be translated into coherence frequency bandwidth of 10's of MHz. In addition, the sub-THz frequency range may provide an enormous available bandwidth, which may be occupied by larger bandwidth carriers, such as 1000 MHz per carrier or above.

As described in connection with FIGS. 7A and 7B, a signal transmitted using a narrower beam may experience less distortion due to fewer reflections or refractions under a line of sight condition. As the width of a beam may be inversely related to the transmitting frequency, a wireless device operating at very high frequencies (e.g., in a sub-THz frequency range) may be able to transmit a signal in a very narrow beam, and the signal may reach the receiver with very little or no distortions. In other words, the received signal at the receiver may have a single lobe that fluctuates (e.g., goes up or down) once or has no fluctuations.

When a received signal does not have many distortions (e.g., the signal does not fluctuate up and down throughout the frequency domain), as explained in connection with FIGS. 7A and 7B, a lower complexity equalizer may be used by the receiver to equalize the received signal. As lower complexity equalizer may include less delay components and/or multipliers and use less sophisticate algorithms, it is likely to be less expensive to manufacture and/or implement compared to the high complexity equalizer. In addition, high complexity equalizers may be impractical for wide carriers (e.g., the 1000 MHz carrier in the sub-THz frequency range) due to wide carriers' larger fast-Fourier transform (FFT) sizes. On the other hand, the complexity of a time domain equalizer may be proportional to the channel bandwidth and/or its ability to handle multipath transmission. Thus, a time domain equalizer for processing a signal or a wide subcarrier at the sub-THz frequency range may be relatively high in complexity and expensive.

Figure 8:
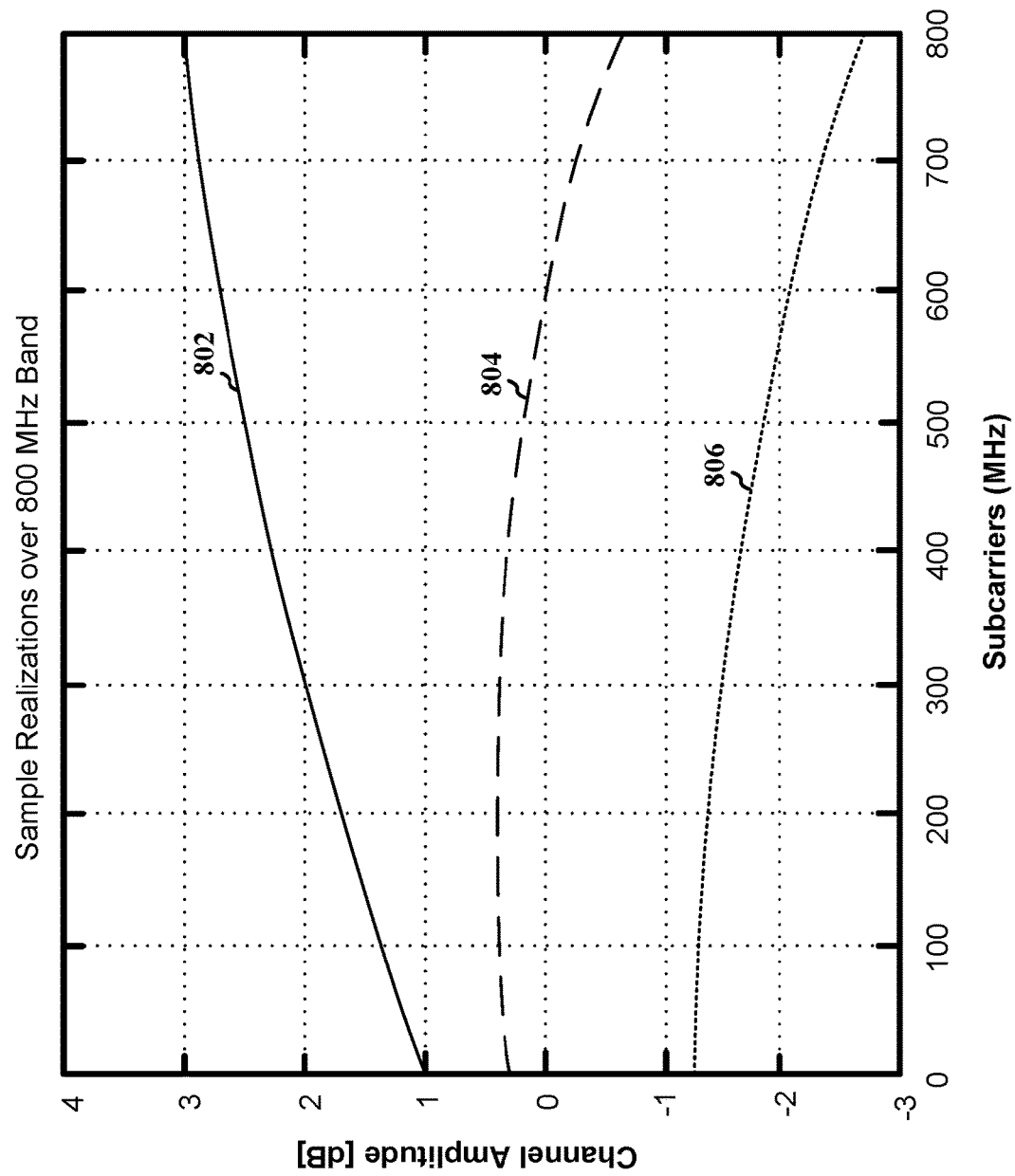
FIG. 8 is a diagram illustrating example signals from a narrow beam transmission within a high frequency range.

FIG. 8 is a diagram 800 illustrating example signals 802, 804 and 806 that may be received/observed by a receiving device from a narrow beam transmission within the sub-THz frequency range, where signals 802, 804 and 806 may have a smooth curve without a notch and/or a peak, e.g., the signals 802, 804 and 806 may fluctuate once or has no fluctuation when it is received by the receiving device. When a transmitted signal reaches a receiver with an attenuation and a delay and without distortion, the signal may be equalized or received with an equalizer having a single delay element or few delay elements. In some examples, an equalizer with a single delay element and/or a receiver receiving a signal from a single path may be referred to as a "single tap receiver" or a "single tap equalizer." In other words, a single tap receiver may be used for a channel that introduces a delay and an attenuation to the transmitted signal without being frequency selective. A channel that introduces a delay and an attenuation to the transmitted signal may also be referred to as a "single tap channel," and the single tap channel may be a flat channel over time domain. Thus, a transmission using a narrow beam may have the capability to provide a single tap channel or few tap channels with a small delay spread (e.g., on the order of a few nanoseconds) as the signal may reach the receiver with little to no distortions. As the single tap receiver may have less components and use lower complexity algorithm to equalize the received signal, the single tap receiver may be relatively cheaper to manufacture and implement compared to the high complexity equalizers. Thus, according to one or more examples, if wireless devices are able to communicate in a single tap channel, the wireless devices may use single tap receivers to receive the signals, which may reduce the cost, power and/or the die size for the receivers of the wireless devices.

A frequency selective signal (e.g., a signal with amplitude fluctuates across the frequency domain) may be flattened at the transmitter through compensating and/or attenuating the signal to provide a more consistent amplitude across the frequencies of the signal. Thus, if non-frequency selective signals (or signals having a reduced amount of fluctuation), such as signals 802, 804 and 806, are converted/tuned into signals with consistent amplitudes in the frequency domain, a receiving device may be able to receive these signals using a lower complexity receiver, such as a single tap receiver which may be used for a single tap channel. In other words, if the effective received channel is of a single tap, the time domain receiver complexity may be reduced, and the overall cost and/or the power consumption of the sub-THz receiver may also be reduced.

Aspects presented herein may enable a receiving device, such as a UE, to receive high frequency signals (e.g., signals within sub-THz frequency range) using a simpler receiver, such as a single tap receiver, to reduce the overall complexity and cost associated with the receiver. In one aspect, the receiving device may transmit a precoding feedback (e.g., a sub-band digital precoded signal) that includes channel flattening information to a transmitting device, such as a base station. Based on the precoding feedback or the channel flattening information, the transmitting device may create a pseudo single tap channel (e.g., a channel that resembles one or more characteristics of a single tap channel) for transmitting data. In other words, the transmitting device may apply attenuation or compensation to a transmitting signal based on the precoding feedback, such that the receiving device may receive the signal with a more constant amplitude in frequency domain (e.g., similar to a flat-line), such as using a single tap receiver. This precoding may be more suitable for communications in a high frequency (e.g., sub-THz) beamformed environment, and it may leverage the resultant single tap channel as a design consideration for low complexity high frequency (e.g., sub-THz) receivers.

Figure 9:
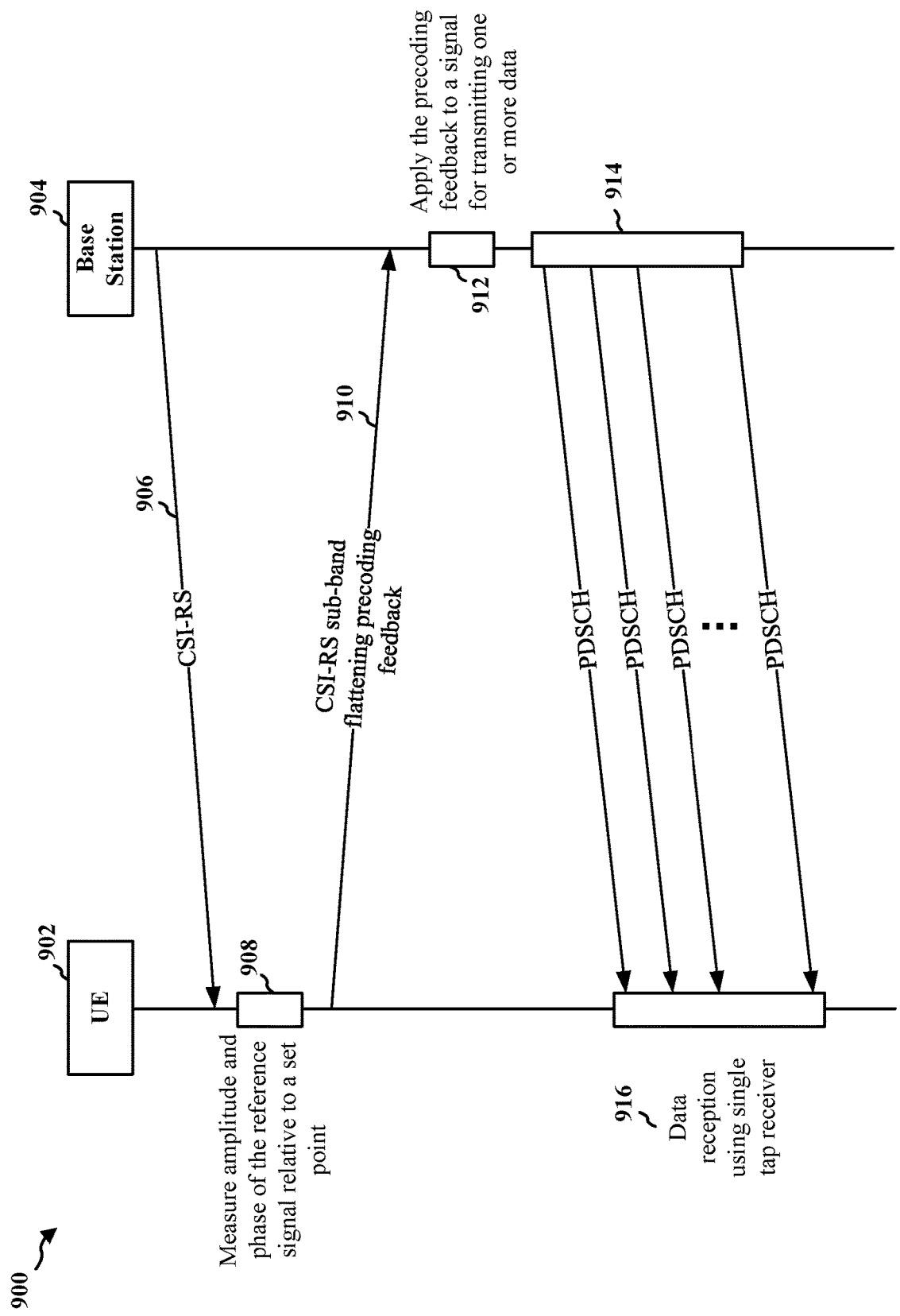
FIG. 9 is an example communication flow between wireless devices according to aspects of the present disclosure.

FIG. 9 is an example communication flow 900 between a UE 902 (e.g., a receiving device or a first wireless device)

and a base station 904 (e.g., a transmitting device or a second wireless device) according to aspects of the present disclosure. At 906, the base station 904 may transmit a signal to the UE 902. The signal 906 may be a reference signal, such as a channel state information reference signal (CSI-RS) (collectively as "reference signal"), that the base station transmits to the UE 902. In some examples, the signal 906 may be data (e.g., a data based on previous transmission). A portion of the signal 906 may be illustrated by a signal 1002 of the diagram 1000 in FIG. 10.

Figure 10:
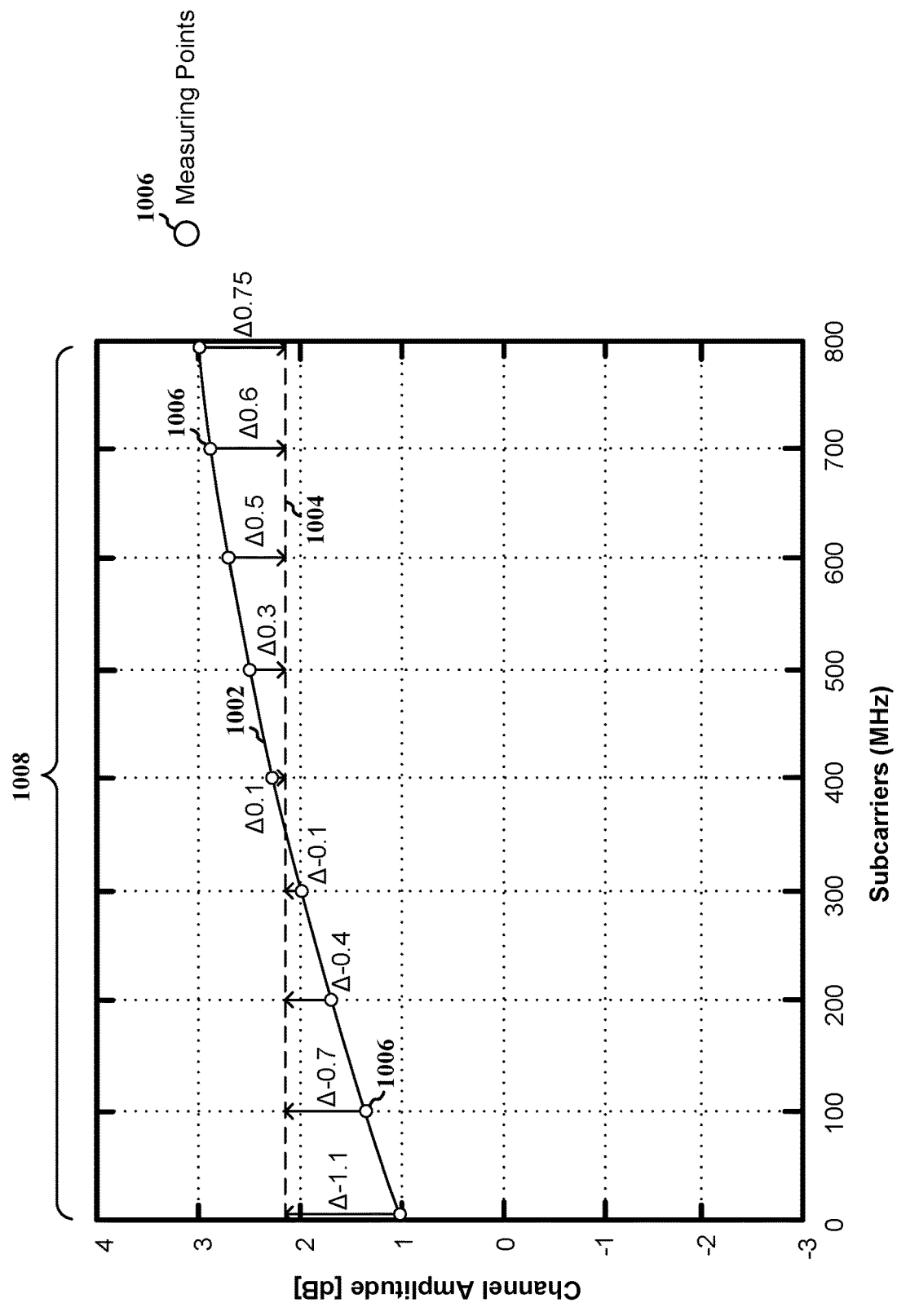
FIG. 10 is a diagram illustrating an example of sub-band flattening according to aspects of the present disclosure.

At 908, the UE 902 may measure amplitude and phase of the reference signal (e.g., signal 1002) relative to a set point. As shown by diagram 1000 of FIG. 10, a set point 1004 may provide a reference amplitude (e.g., a point or a value, etc.) for the UE 902 to measure the differences in amplitudes between the reference signal 1002 and the set point 1004 at one or more measuring points 1006 (e.g., at different frequencies or subcarrier frequencies, etc.). In some examples, the reference amplitude may be referred to as a set point. For example, as shown by FIG. 10, the set point 1004 may be set to 2.1 dB for an 800 MHz sub-band 1008 (e.g., subcarriers) and multiple measurement points 1006 may be configured for or defined at the UE 902. For example, the UE 902 may be configured to make measurements or to set measurement points 1006 at a fixed interval (e.g., 10 MHz, 25 MHz, 100 MHz, etc.) within the sub-band 1008 and/or at defined frequencies (e.g., 0 MHz, 200 MHz, 500 MHz, etc.) relative to the sub-band 1008 or relative to an actual frequency range (e.g., 0 Hz to 300 THz), etc. For example, as shown by diagram 1000, the UE 902 may measure the differences in amplitudes between the reference signal 1002 and the set point 1004 at every 100 MHz interval within the sub-band 1008, where the UE 902 may obtain an amplitude difference of −1.1 dB at 0 MHz (e.g., relative to the sub-band), −0.7 dB at 100 MHz, 0.3 dB at 500 MHz, 0.75 dB at 800 MHz, etc.

Referring back to FIG. 9, at 910, after the UE 902 measures the differences in amplitudes between the reference signal 1002 and the set point 1004 for the sub-band 1008, such as at measurement points 1006, the UE 902 may transmit the measurements to the base station 904. For example, the UE 902 may provide the base station 904 with measurements relative to a flat line channel, e.g., with difference measurements relative to the flat line channel at each of the frequency intervals. For example, the measurements may be transmitted in a sub-band precoding feedback report which may be used by the base station 904 as a reference to tune the signal transmitted to the UE 902, such as for flattening (e.g., applying zero-forcing to) a transmitting signal. In other words, the sub-band precoding feedback report may include one or more per-sub-band-coefficients for flattening a channel frequency response of an occupied bandwidth, such as within the sub-band 1008.

At 912, after the base station 904 receives the measurements, such as in a precoding feedback, the base station 904 may tune the amplitude and/or the phase for one or more signals that are to be transmitted to the UE 902 (e.g., signals carrying one or more data such as the PDSCHs) based at least in part on the received measurements. The precoding feedback may be sub-band precoding feedback. For example, the base station 904 may apply at least one of an attenuation or a compensation to the one or more signals based on the received measurements, such that the UE 902 may receive the one or more signals in a desired waveform.

Figure 11:
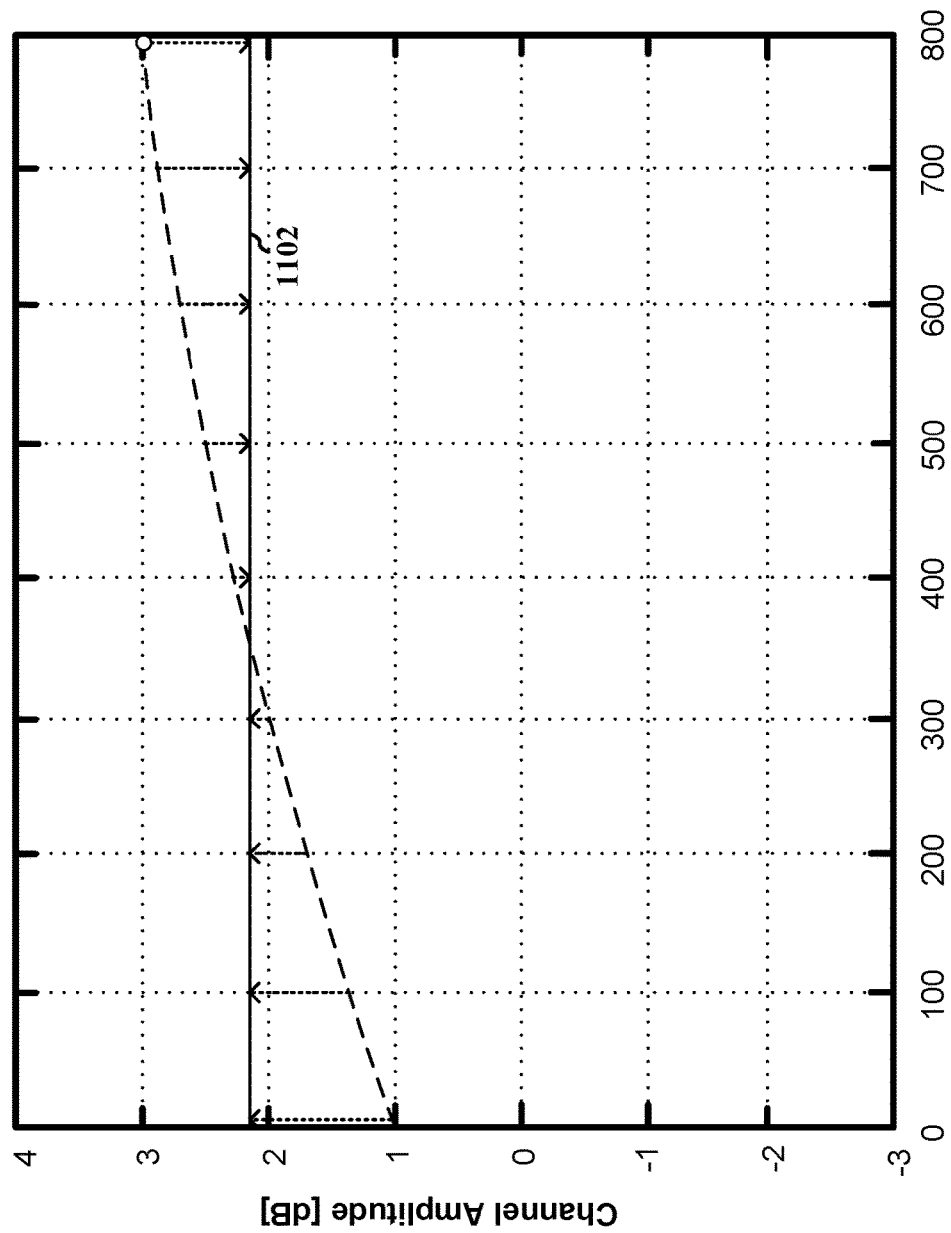
FIG. 11 is a diagram illustrating an example of a flattened sub-band according to aspects of the present disclosure.

At 914, the base station 904 may transmit the tuned/adjusted signals (e.g., PDSCHs) to the UE 902. When the UE 902 receives the one or more signals from the base station 904, such as at 916, the tuned/adjusted one or more signals may have a more consistent (e.g., similar or the same) amplitudes throughout different frequencies. The adjustment applied to each of the signals may help to flatten the channel across multiple subcarriers, e.g., to reduce a variation relative to a flat line channel. In other words, the one or more signals may be perceived by the UE 902, or processed by the UE, as a flat-line, such as shown by the received signal 1102 in diagram 1100 of FIG. 11. As the received signals may have a similar or identical amplitude throughout the frequencies, the received signals may resemble the characteristics of signals transmitted/received in a single tap channel. Thus, the UE 902 may receive the one or more signals using a single tap receiver. This may greatly reduce the complexity and cost for the receiver(s) at the UE 902, and may enable the UE 902 to use single tap receivers without degrading their performance. The UE 902 and the base station 904 may repeat the same process after certain durations and/or transmissions.

Figure 12:
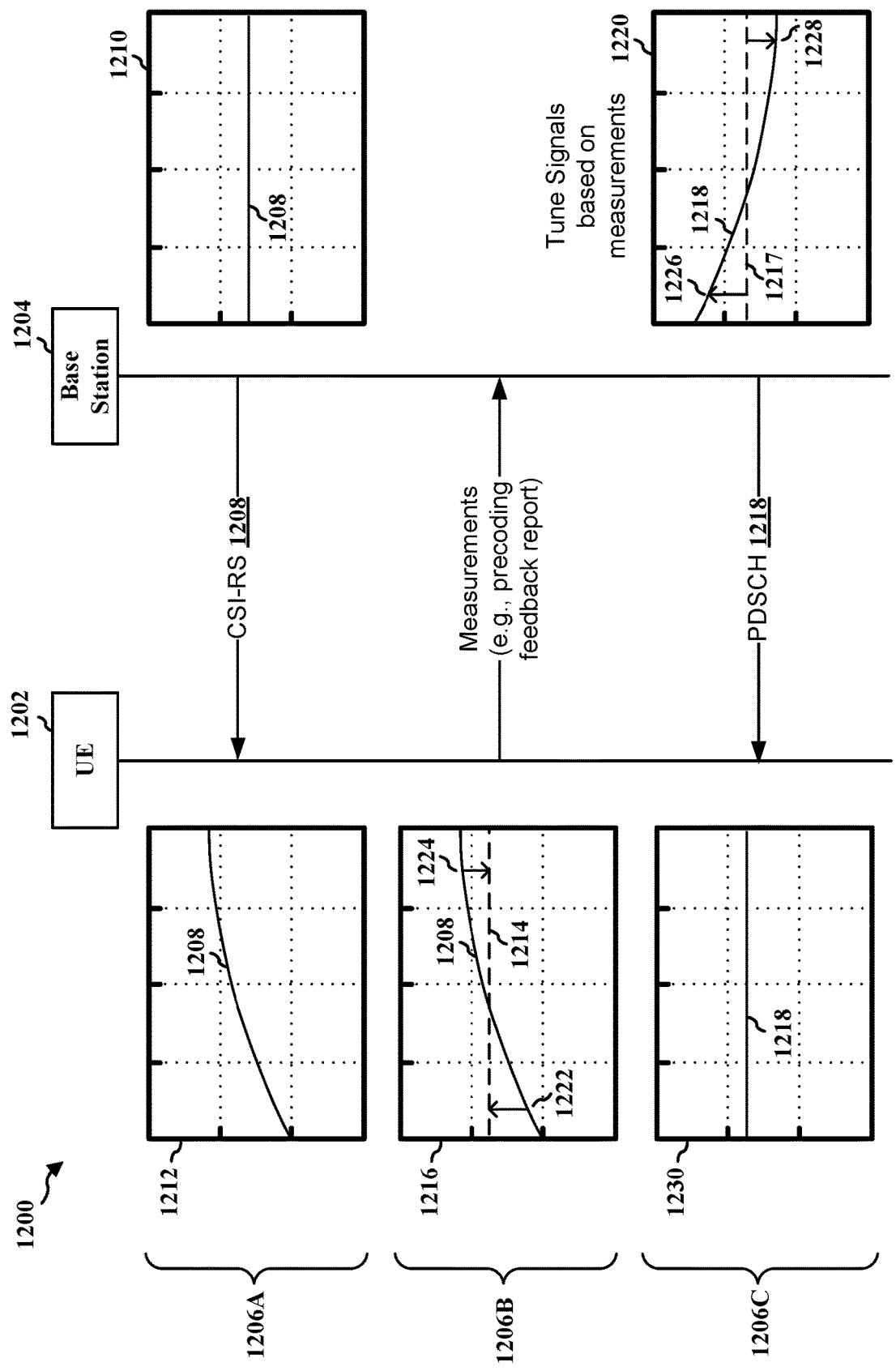
FIG. 12 is an example communication flow between wireless devices according to aspects of the present disclosure.

FIG. 12 is a diagram 1200 illustrating another example of creating a pseudo single tap channel (e.g., a flat channel over time domain) according to aspects of the present disclosure. At 1206A, a base station 1204 (e.g., a transmitting device or a first wireless device) may transmit a reference signal 1208 to a UE 1202 (e.g., a receiving device or a first wireless device). For purpose of the illustration, the transmitted reference signal 1208 is shown as a flat horizontal line at the base station 1204, such as shown by graph 1210. As the reference signal 1208 may be used by the UE 1202 for measuring or estimating the path losses at different frequencies, the reference signal 1208 may be in any waveform shape. After the UE 1202 receives the reference signal 1208, due to possible path losses (e.g., free space impairments of propagating signal), the reference signal 1208 may be in a different waveform as received/perceived by the UE 1202, such as shown by graph 1212.

At 1206B, the UE 1202 may measure the amplitude and/or the phase of the received reference signal 1208 relative to a set point 1214, such as shown by graph 1216. As described in connection with FIG. 9, the set point 1214 may provide a reference amplitude for the UE 1202 to measure the differences in amplitudes between the reference signal 1208 and the set point 1214 at one or more measuring points. The measurements may be used by the base station 1204 as per-sub-band-coefficients for flattening the channel frequency response of an occupied bandwidth or a sub-band. After measuring the differences (e.g., in amplitudes and/or phase) between the reference signal 1208 and the set point 1214, the UE 1202 may transmit the measurements to the base station 1204. For example, the UE 1202 may transmit the measurements in a sub-band precoding feedback report. The feedback report may contain at least channel flattening information, which may be different from a feedback report that contains spectral efficiency information, such as PMI, CQI and rank indicator (RI) feedbacks. In other words, the optimization criteria and payload structure in the report may be for the channel flattening rather than spectral efficiency criteria.

At 1206C, after the base station 1204 receives the precoding feedback report (or the per-sub-band coefficients), the base station 1204 may use the precoding feedback to create a pseudo single tap channel such that the signal received by the UE 1202 through the single tap channel may have a more consistent or the same amplitude throughout the frequencies. For example, a precoding feedback report may indicate that the difference in amplitude at a first measurement point 1222 (e.g., within graph 1216) is −1.1 dB (e.g., relative to the set point 1214) and at a second measurement point 1224 is 0.7 dB. When the base station 1204 is transmitting a PDSCH 1217, which is shown as a flat-line in the graph 1220 for purpose of illustration, the base station 1204 may apply a compensation of 1.1 dB (e.g., increase 1.1 dB) to the PDSCH 1217 that is to be transmitted to the UE 1202 at the frequency that corresponds to the measurement point 1222 (e.g., at point 1226), and the base station 1204 may also apply an attenuation of 0.7 dB (e.g., decrease 0.7 dB) for the PDSCH 1217 at the frequency that corresponds to the measurement point 1222 (e.g., at point 1228). Based on the precoding feedback report, the base station 1204 may tune the original PDSCH 1217 into a tuned PDSCH 1218, and may transmit the tuned PDSCH 1218 to the UE 1202. Thus, when the UE 1202 receives the PDSCH 1218, the amplitude of the PDSCH 1218 may be more consistent or the same throughout different frequencies within the sub-band as the base station 1204 has pre-compensate/attenuate. For example, as shown by graph 1230, the PDSCH 1218 may be received and perceived by the UE 1202 as a signal received from a single tap channel, where the frequency band of the PDSCH 1218 may resemble a flat-line (e.g., having same amplitude) in frequency domain. Thus, the UE 1202 may receive the PDSCH 1218 using a single tap receiver. In another example, when aspects presented herein are used in association with the sub-THz frequency range, the precoding feedback may be used by a sub-THz transmitter (e.g., at the base station 1204), resulting in a pseudo single tap channel from the sub-THz receiver's (e.g., at the UE 1202) point of view. This may enable lower cost, power and/or die size receivers for the sub-THz devices.

Figure 13:
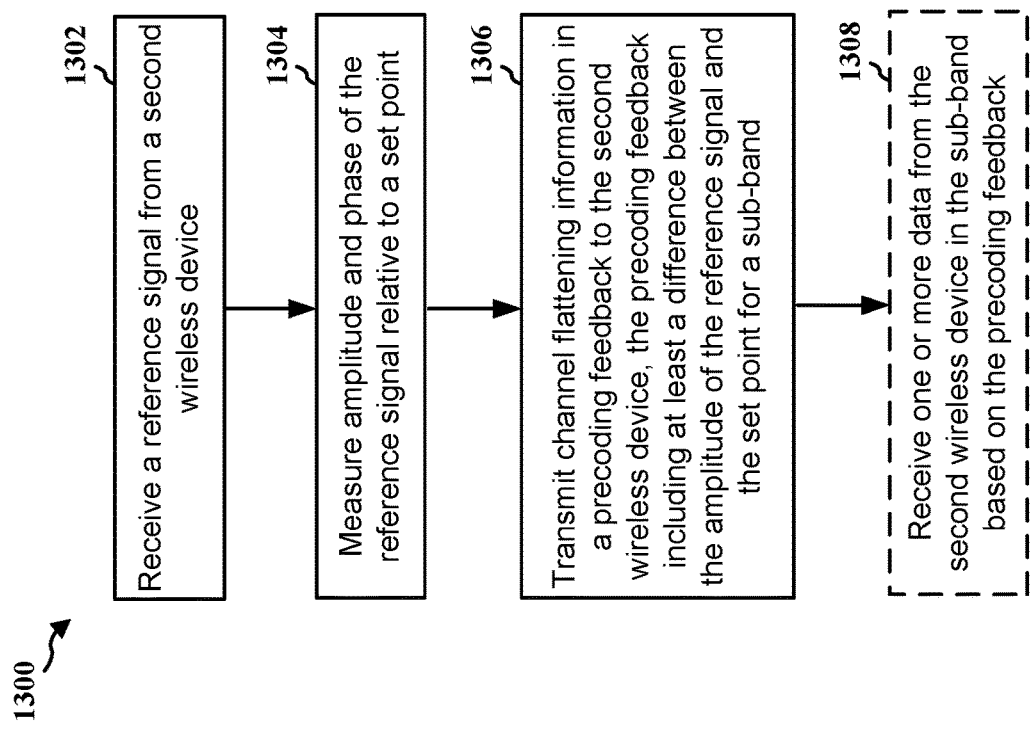
FIG. 13 is a flowchart of a method of wireless communication.

FIG. 13 is a flowchart of a method 1300 of wireless communication. The method may be performed by a first wireless device or a component of a first wireless device (e.g., the UE 104, 350, 902, 1202; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the first wireless device to measure and report to a base station or another wireless device one or more coefficients for flattening one or more channel frequency responses of an occupied bandwidth (e.g., a sub-band).

At 1302, the first wireless device may receive a reference signal from a second wireless device, such as described in connection with FIGS. 9 and 12. For example, at 906, the UE 902 may receive a reference signal from the base station 904. The reference signal may be a CSI-RS. Thus, the first wireless device may be a user equipment and the second wireless device may be a base station. The reception of the reference signal may be performed, e.g., by the reception component 1430, the reference signal processing component 1440, and/or the RF transceiver 1422 of the apparatus in FIG. 14.

At 1304, the first wireless device may measure amplitude and phase of the reference signal relative to a set point, such as described in connection with FIGS. 9 and 12. For example, at 908, the UE 902 may measure amplitude and phase of the reference signal relative to a set point. The set point may be used to provide a consistent amplitude on a frequency domain. The measurement may be performed, e.g., by the measurement component 1442 of the communication manager 1432 of the apparatus 1402.

At 1306, the first wireless device may transmit channel flattening information in a precoding feedback to the second wireless device, where the precoding feedback may include at least a difference between the amplitude of the reference signal and the set point for a sub-band, such as described in connection with FIGS. 9 and 12. For example, at 910, after the UE 902 measures the differences in amplitudes between the reference signal 1002 and the set point 1004 for the sub-band 1008, the UE 902 may transmit the measurements to the base station 904. The transmission may be performed, e.g., by the transmission component 1434, the precoding feedback component 1444, and/or the RF transceiver 1422 of the apparatus in FIG. 14. The sub-band may comprise a frequency range in THz or sub-THz. In addition, the channel flattening information may be different from spectral efficiency information. In one example, the precoding feedback may include one or more sub-band coefficients for flattening a channel frequency response of an occupied bandwidth in the sub-band, where the sub-band coefficients may be obtained based on the measurement between the reference signal and the set point. In another example, the precoding feedback may also indicate a per sub-band flattening coefficient for multiple sub-bands.

At 1308, after the first wireless device transmits the precoding feedback containing the channel flattening information to the second wireless device, the first wireless device may receive one or more data from the second wireless device in the sub-band based on the precoding feedback, such as described in connection with steps 914 and 1206C of FIGS. 9 and 12. For example, the first wireless device may receive a transmission having a phase and/or amplitude adjustment based on the precoding feedback. In another example, the first wireless device may receive the one or more data in a single tap channel, such as by using a single tap receiver.

Figure 14:
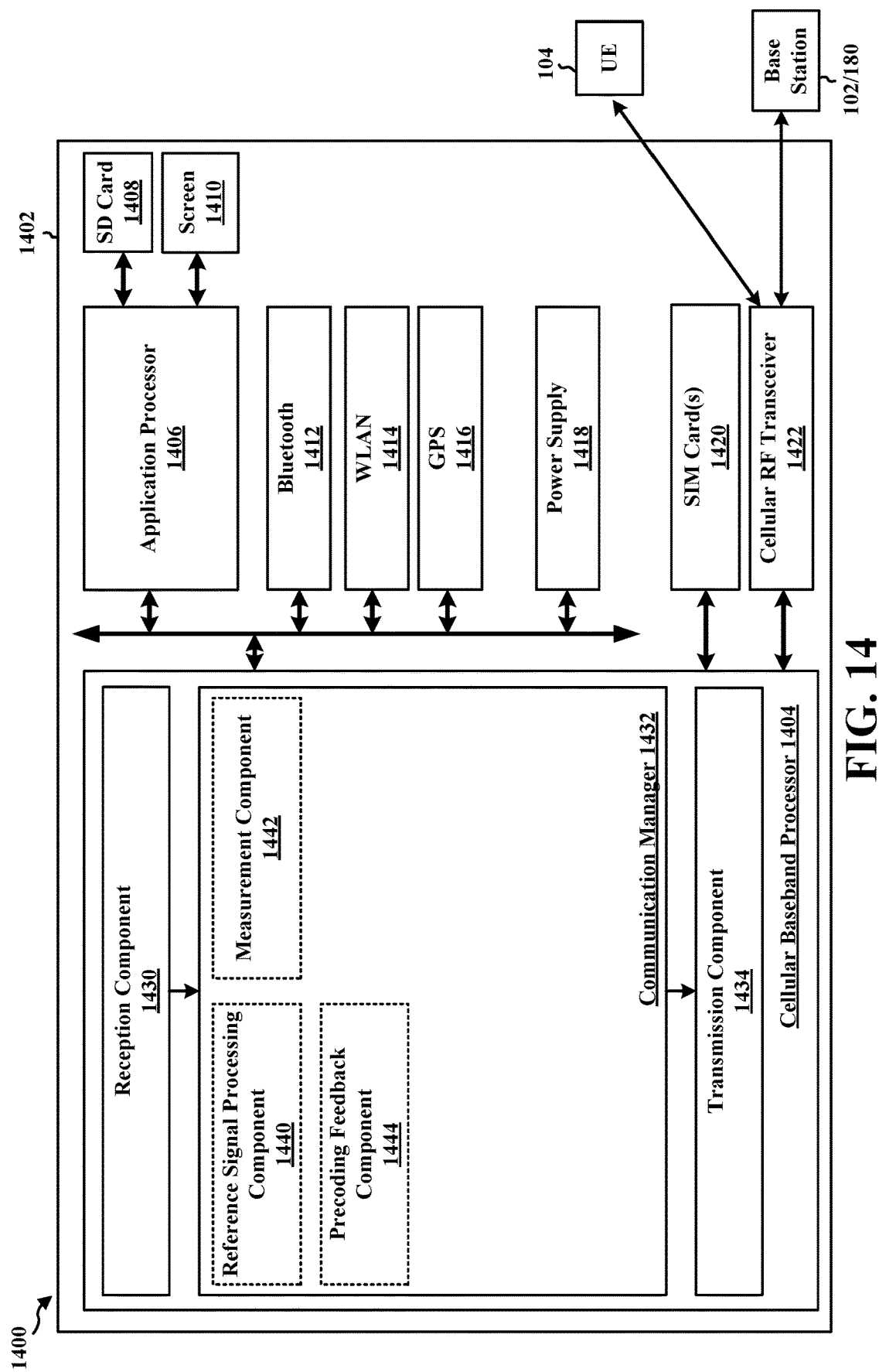
FIG. 14 is a diagram illustrating an example of a hardware implementation for an example apparatus.

FIG. 14 is a diagram 1400 illustrating an example of a hardware implementation for an apparatus 1402. In some examples, the apparatus 1402 may be a UE. In other examples, the apparatus 1402 may be another wireless device receiving wireless communication. In some examples, the apparatus 1402 may be a wireless device receiving transmissions in the sub-THz frequency range. The apparatus 1402 includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422, e.g., with the UE 104 and/or BS 102/180. The cellular baseband processor 1404 may include a computer-readable medium/memory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a reference signal processing component 1440 that is configured to receive a reference signal from a second wireless device, e.g., as described in connection with 1302 of FIG. 13. The communication manager 1432 further includes a measurement component 1442 that is configured to measure amplitude and phase of the reference signal relative to a set point, e.g., as described in connection with 1304 of FIG. 13. The communication manager 1432 further includes a precoding feedback component 1444 that is configured to transmit channel flattening information in a precoding feedback to the second wireless device, the precoding feedback including at least a difference between the amplitude of the reference signal and the set point for a sub-band, e.g., as described in connection with 1306 of FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for receiving a reference signal from a second wireless device. For example, the reference signal processing component 1440, the reception component 1430, and/or the cellular RF transceiver 1422 may provide means for receiving a reference signal from a second wireless device with various other apparatus. The apparatus 1402 includes means for measuring amplitude and phase of the reference signal relative to a set point. For example, the measuring component 1442 of the communication manager 1432 may provide means for measuring amplitude and phase of the reference signal relative to a set point with various other apparatus. The apparatus 1402 includes means for transmitting channel flattening information in a precoding feedback to the second wireless device, the precoding feedback including at least a difference between the amplitude of the reference signal and the set point for a sub-band. For example, the precoding feedback component 1444, the transmission component 1434, and/or the cellular RF transceiver 1422 may provide means for transmitting channel flattening information in a precoding feedback to the second wireless device with various other apparatus. The channel flattening information may be different from spectral efficiency information. The apparatus 1402 may optionally include means for receiving one or more data from the second wireless device in the sub-band based on the precoding feedback. The reception component 1430 and/or the RF cellular transceiver may provide the means for receiving the data based on the precoding feedback, such as by using the reference signal processing component 1440, measuring component 1442, and/or precoding feedback component 1444 with various other apparatus. The sub-band may comprise a frequency range in THz or sub-THz. In one configuration, the one or more data is received in a single tap channel using a single tap receiver.

In one configuration, the precoding feedback comprises one or more sub-band coefficients for flattening a channel frequency response of an occupied bandwidth in the sub-band. In such configuration, the precoding feedback indicates a per sub-band flattening coefficient for multiple sub-bands.

In one configuration, the first wireless device is a user equipment and the second wireless device is a base station.

The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
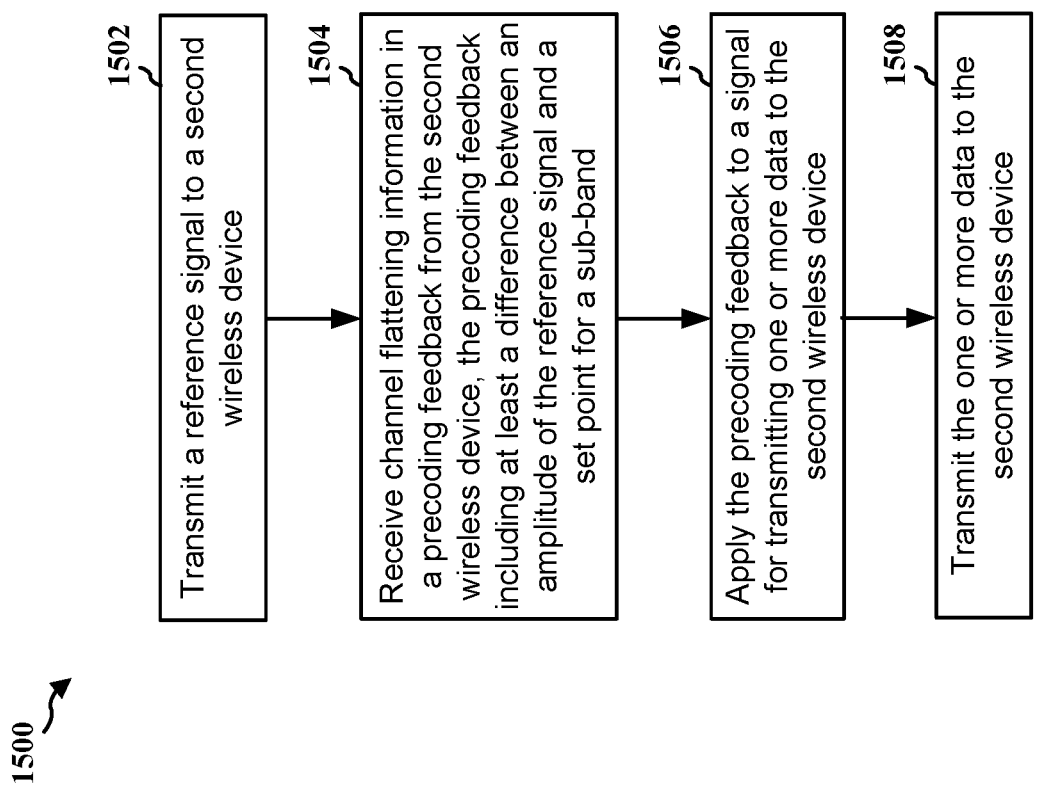
FIG. 15 is a flowchart of a method of wireless communication.

FIG. 15 is a flowchart 1500 of a method of wireless communication. The method may be performed by a first wireless device or a component of a first wireless device (e.g., the base station 102, 180, 310, 904, 1204; a processing system, which may include the memory 376 and which may be the entire base station 310 or a component of the base station 310, such as the TX processor 316 the RX processor 370, and/or the controller/processor 375). Optional aspects are illustrated with a dashed line. The method may enable the first wireless device to create a pseudo single tap channel for transmitting data based on the channel flattening information received from a receiving device.

At 1502, the first wireless device may transmit a reference signal to a second wireless device, such as described in connection with FIGS. 9 and 12. For example, at 906, the base station 904 may transmit a reference signal (e.g., CSI-RS) to the UE 902. As such, the first wireless device may be a base station and the second wireless device may be a user equipment. The transmission of the reference signal may be performed, e.g., by the transmission component 1634 and/or the reference signal processing component 1640 of the apparatus in FIG. 14.

At 1504, the first wireless device may receive channel flattening information in a precoding feedback from the second wireless device, where the precoding feedback may include at least a difference between an amplitude of the reference signal and a set point for a sub-band, such as described in connection with FIGS. 9 and 12. For example, at 910, after the UE 902 measures the differences in amplitudes between the reference signal 1002 and the set point 1004 for the sub-band 1008, UE 902 may transmit the measurements to the base station 904, where the UE 902 may transmit the measurements in a precoding feedback. The sub-band may include a frequency range in THz or sub-THz. In addition, the channel flattening information may be different from spectral efficiency information. In one example, the precoding feedback may include one or more sub-band coefficients for flattening a channel frequency response of an occupied bandwidth in the sub-band, where the sub-band coefficients may be obtained based on the measurement between the reference signal and the set point by the second wireless device. In another example, the precoding feedback may also indicate a per sub-band flattening coefficient for multiple sub-bands. The set point may be used to provide a consistent amplitude on a frequency domain. The reception of the channel flattening information in a precoding feedback may be performed, e.g., by the reception component 1630 and/or the precoding feedback reception component 1642 of the apparatus in FIG. 14.

At 1506, the first wireless device may apply the precoding feedback to a signal for transmitting one or more data to the second wireless device, such as described in connection with FIGS. 9 and 12. For example, at 912, after the base station 904 receives the measurements, the base station 904 may tune the amplitude and/or the phase for one or more signals that are to be transmitted to the UE 902 based at least in part on the received measurements. Thus, in applying the precoding feedback to the signal for transmitting the one or more data, the first wireless device may apply at least one of an attenuation or a compensation to the signal based on the precoding feedback. The application of the precoding feedback to a signal may be performed, e.g., by the channel flattening component 1644 and/or the tuned signal transmission component 1646 of the apparatus in FIG. 14.

At 1508, the first wireless device may transmit the one or more data to the second wireless device, such as described in connection with FIGS. 9 and 12. For example, at 914, the base station 904 may transmit the tuned signals (e.g., PDSCHs) to the UE 902. In one example, first wireless device may transmit the one or more data through a single tap channel. The transmission of the one or more data may be performed, e.g., by the tuned signal transmission component 1646 and/or the transmission component 1634 of the apparatus in FIG. 14.

Figure 16:
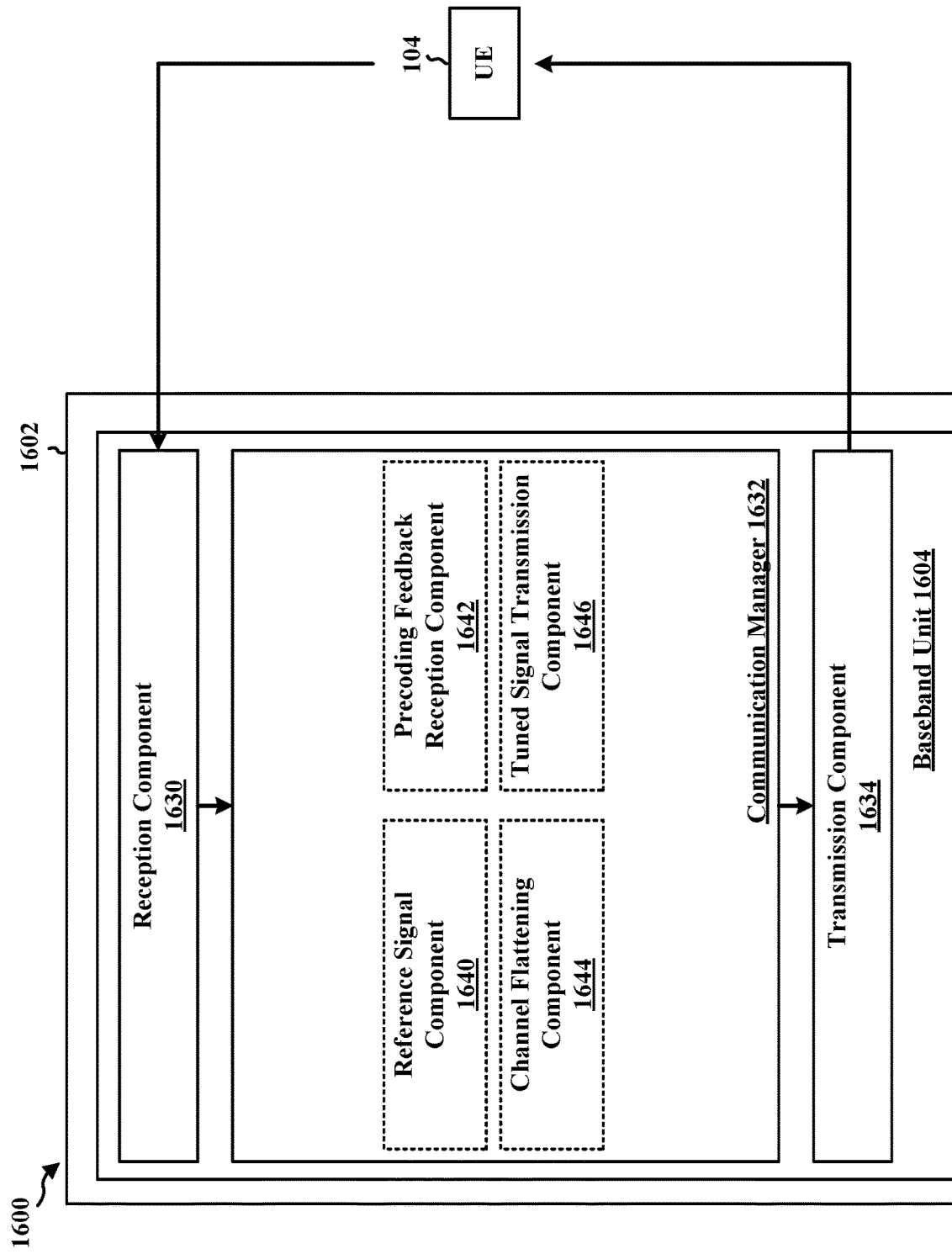
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, in some examples. In other examples, the apparatus may be a transmitting device. In some examples, the apparatus 1602 may be a wireless device transmitting transmissions in the sub-THz frequency range. The apparatus 1602 includes a baseband unit 1604. The baseband unit 1604 may communicate through a cellular RF transceiver with the UE 104 or other wireless device. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of a BS 310, or other wireless device, and may include the memory 376 and/or at least one of the TX processor 316, the RX processor 370, and the controller/processor 375.

The communication manager 1632 includes a reference signal component 1640 that is configured to transmit a reference signal to a second wireless device, e.g., as described in connection with 1502 of FIG. 15. The communication manager 1632 further includes a precoding feedback reception component 1642 that is configured to receive channel flattening information in a precoding feedback from the second wireless device, the precoding feedback includes at least a difference between an amplitude of the reference signal and a set point for a sub-band, e.g., as described in connection with 1504 of FIG. 15. The communication manager 1632 includes a channel flattening component 1644 that is configured to apply the precoding feedback to a signal for transmitting one or more data to the second wireless device, e.g., as described in connection with 1506 of FIG. 15. The communication manager 1632 includes a tuned signal transmission component 1646 that is configured to transmit the one or more data to the second wireless device, e.g., as described in connection with 1508 of FIG. 15.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for transmitting a reference signal to a second wireless device. For example, the reference signal component 1640, the transmission component 1634, of the baseband unit 1604 may provide means for transmitting a reference signal to a second wireless device with various other apparatus. The apparatus 1602 includes means for receiving channel flattening information in a precoding feedback from the second wireless device, the precoding feedback includes at least a difference between an amplitude of the reference signal and a set point for a sub-band. In addition, the channel flattening information may be different than the spectral efficiency information. For example, the precoding feedback reception component 1642 of the communication manager 1632 may provide means for receiving channel flattening information in a precoding feedback from the second wireless device, the precoding feedback includes at least a difference between an amplitude of the reference signal and a set point for a sub-band with various other apparatus. The apparatus 1602 includes means for applying the precoding feedback to a signal for transmitting one or more data to the second wireless device. For example, the channel flattening component 1644 of the communication manager may provide means for applying the precoding feedback to a signal for transmitting one or more data to the second wireless device with various other apparatus. The apparatus 1602 includes means for transmitting the one or more data to the second wireless device. The one or more data may be transmitted in a single tap channel. For example, the tuned signal transmission component 1646 of the communication manager 1632 may provide means for transmitting the one or more data to the second wireless device with various other apparatus. The apparatus 1602 includes means for applying at least one of an attenuation or a compensation to the signal based on the precoding feedback, such as by through the reference signal component 1640, the precoding feedback reception component 1642, the channel flattening component 1644, the tuned signal transmission component 1646 and/or with various other apparatus. The sub-band may comprise a frequency range in THz or sub-THz.

In one configuration, the precoding feedback comprises one or more sub-band coefficients for flattening a channel frequency response of an occupied bandwidth in the sub-band. In such configuration, the precoding feedback indicates a per sub-band flattening coefficient for multiple sub-bands.

In one configuration, the first wireless device is a base station and the second wireless device is a user equipment.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Aspects presented herein may enable a receiving device, such as a UE, to receive high frequency signals (e.g., signals within sub-THz frequency range) using a simpler receiver, such as a single tap receiver. Thus, the overall complexity and cost associated with the receiver may be reduced. Aspects presented herein may be more suitable for communications in a high frequency (e.g., sub-THz) beamformed environment, and it may leverage the resultant single tap channel as a design consideration for low complexity high frequency (e.g., sub-THz) receivers.

The following examples are illustrative only and aspects thereof may be combined with aspects of other examples or teaching described herein, without limitation.

Aspect 1 is a method of a method of wireless communication at a first wireless device, comprising: receiving a reference signal from a second wireless device; measuring amplitude and phase of the reference signal relative to a set point; and transmitting channel flattening information in a precoding feedback to the second wireless device, the precoding feedback including at least a difference between the amplitude of the reference signal and the set point for a sub-band.

In aspect 2, the method of aspect 1 further comprises: receiving one or more data from the second wireless device in the sub-band based on the precoding feedback.

In aspect 3, the method of aspect 1 or aspect 2 further comprises: receiving one or more data from the second wireless device wherein the one or more data is received in a single tap channel.

In aspect 4, the method of any of aspects 1-3 further comprises: receiving one or more data from the second wireless device wherein the one or more data is received using a single tap receiver.

In aspect 5, the method of any of aspects 1-4 further comprises: receiving one or more data from the second wireless device wherein the one or more data is received in a flat channel over time domain.

In aspect 6, the method of any of aspects 1-5 further includes that the set point is non-frequency selective.

In aspect 7, the method of any of aspects 1-6 further includes that the set point provides a consistent amplitude on a frequency domain.

In aspect 8, the method of any of aspects 1-7 further includes that the precoding feedback comprises one or more sub-band coefficients for flattening a channel frequency response of an occupied bandwidth in the sub-band.

In aspect 9, the method of any of aspects 1-8 further includes that the precoding feedback indicates a per sub-band flattening coefficient for multiple sub-bands.

In aspect 10, the method of any of aspects 1-9 further includes that the sub-band comprises a frequency range in THz or sub-THz.

In aspect 11, the method of any of aspects 1-10 further includes that the channel flattening information is different than spectral efficiency information.

In aspect 12, the method of any of aspects 1-11 further includes that the first wireless device is a user equipment and the second wireless device is a base station.

Aspect 13 is a method of wireless communication at a first wireless device, comprising: transmitting a reference signal to a second wireless device; receiving channel flattening information in a precoding feedback from the second wireless device, the precoding feedback includes at least a difference between an amplitude of the reference signal and a set point for a sub-band; applying the precoding feedback to a signal for transmitting one or more data to the second wireless device; and transmitting the one or more data to the second wireless device.

In aspect 14, the method of aspect 13 further includes that the set point is non-frequency selective.

In aspect 15, the method of aspect 13 or aspect 14 further includes that the set point provides a consistent amplitude on a frequency domain.

In aspect 16, the method of any of aspects 13-15 further includes that the applying the precoding feedback to the signal for transmitting the one or more data to the second wireless device further comprises: applying at least one of an attenuation or a compensation to the signal based on the precoding feedback.

In aspect 17, the method of any of aspects 13-16 further includes that the precoding feedback comprises one or more sub-band coefficients for flattening a channel frequency response of an occupied bandwidth in the sub-band.

In aspect 18, the method of any of aspects 13-17 further includes that the precoding feedback indicates a per sub-band flattening coefficient for multiple sub-bands.

In aspect 19, the method of any of aspects 13-18 further includes that the sub-band comprises a frequency range in THz or sub-THz.

In aspect 20, the method of any of aspects 13-19 further includes that the one or more data is transmitted in a single tap channel.

In aspect 21, the method of any of aspects 13-20 further includes that the channel flattening information is different than spectral efficiency information.

In aspect 22, the method of any of aspects 13-21 further includes that the first wireless device is a base station and the second wireless device is a user equipment.

Aspect 23 is an apparatus comprising: a memory; and at least one processor coupled to the memory, the memory and the at least one processor configured to perform the method of any of Aspects 1-12.

Aspect 24 is an apparatus comprising: means the method of any of Aspects 1-12.

Aspect 25 is a non-transitory computer-readable medium storing computer executable code for wireless communication of a first wireless device, the code when executed by a processor cause the processor to perform the method of any of Aspects 1-12.

Aspect 26 is an apparatus for wireless communication, comprising: a memory; and at least one processor coupled to the memory, the memory and the at least one processor configured to perform the method of any of Aspects 13-22.

Aspect 27 is an apparatus for wireless communication, comprising: means for performing the method of any of Aspects 13-22.

Aspect 28 is a non-transitory computer-readable medium storing computer executable code for wireless communication of a first wireless device, the code when executed by a processor cause the processor to perform the method of any of Aspects 13-22.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if", "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first wireless device, comprising:
   receiving a reference signal from a second wireless device;
   measuring amplitude and phase of the reference signal relative to a set point; and
   transmitting channel flattening information in a precoding feedback to the second wireless device, the precoding feedback including at least a difference between the amplitude of the reference signal and the set point for a sub-band.

2. The method of claim 1, further comprising:
   receiving one or more data from the second wireless device in the sub-band based on the precoding feedback.

3. The method of claim 1, further comprising:
   receiving one or more data from the second wireless device in a single tap channel.

4. The method of claim 1, further comprising:
   receiving one or more data from the second wireless device using a single tap receiver.

5. The method of claim 1, wherein the set point is non-frequency selective.

6. The method of claim 1, wherein the set point provides a consistent amplitude on a frequency domain.

7. The method of claim 1, wherein the precoding feedback comprises one or more sub-band coefficients for flattening a channel frequency response of an occupied bandwidth in the sub-band.

8. The method of claim 7, wherein the precoding feedback indicates a per sub-band flattening coefficient for multiple sub-bands.

9. The method of claim 1, wherein the sub-band comprises a frequency range in Terahertz (THz) or sub-THz.

10. The method of claim 1, wherein the channel flattening information is different than spectral efficiency information.

11. The method of claim 1, wherein the first wireless device is a user equipment and the second wireless device is a base station.

12. A method of wireless communication at a first wireless device, comprising:
    transmitting a reference signal to a second wireless device;
    receiving channel flattening information in a precoding feedback from the second wireless device, the precoding feedback including at least a difference between an amplitude of the reference signal and a set point for a sub-band;
    applying the precoding feedback to a signal for transmitting one or more data to the second wireless device; and
    transmitting the one or more data to the second wireless device.

13. The method of claim 12, wherein the set point is non-frequency selective.

14. The method of claim 12, wherein the set point provides a consistent amplitude on a frequency domain.

15. The method of claim 12, wherein the applying the precoding feedback to the signal for transmitting the one or more data to the second wireless device further comprises:
    applying at least one of an attenuation or a compensation to the signal based on the precoding feedback.

16. The method of claim 12, wherein the precoding feedback comprises one or more sub-band coefficients for flattening a channel frequency response of an occupied bandwidth in the sub-band.

17. The method of claim 16, wherein the precoding feedback indicates a per sub-band flattening coefficient for multiple sub-bands.

18. The method of claim 12, wherein the sub-band comprises a frequency range in Terahertz (THz) or sub-THz.

19. The method of claim 12, wherein the one or more data is transmitted in a single tap channel.

20. The method of claim 12, wherein the channel flattening information is different than spectral efficiency information.

21. The method of claim 12, wherein the first wireless device is a base station and the second wireless device is a user equipment.

22. An apparatus for wireless communication of a first wireless device, comprising:
- a memory; and
- at least one processor coupled to the memory, the memory and the at least one processor configured to:
  - receive a reference signal from a second wireless device;
  - measure amplitude and phase of the reference signal relative to a set point; and
  - transmit channel flattening information in a precoding feedback to the second wireless device, the precoding feedback including at least a difference between the amplitude of the reference signal and the set point for a sub-band.

23. The apparatus of claim 22, wherein the memory and the at least one processor are further configured to:
- receive one or more data from the second wireless device in the sub-band based on the precoding feedback.

24. The apparatus of claim 22, wherein the memory and the at least one processor are further configured to:
- receive one or more data from the second wireless device in a single tap channel.

25. The apparatus of claim 22, wherein the memory and the at least one processor are further configured to:
- receive one or more data from the second wireless device using a single tap receiver.

26. The apparatus of claim 22, wherein the set point is non-frequency selective.

27. The apparatus of claim 22, wherein the set point provides a consistent amplitude on a frequency domain.

28. The apparatus of claim 22, wherein the precoding feedback comprises one or more sub-band coefficients for flattening a channel frequency response of an occupied bandwidth in the sub-band.

29. The apparatus of claim 28, wherein the precoding feedback indicates a per sub-band flattening coefficient for multiple sub-bands.

30. The apparatus of claim 22, wherein the sub-band comprises a frequency range in Terahertz (THz) or sub-THz.

31. The apparatus of claim 22, wherein the channel flattening information is different than spectral efficiency information.

32. The apparatus of claim 22, wherein the first wireless device is a user equipment and the second wireless device is a base station.

33. An apparatus for wireless communication of a first wireless device, comprising:
- means for receiving a reference signal from a second wireless device;
- means for measuring amplitude and phase of the reference signal relative to a set point; and
- means for transmitting channel flattening information in a precoding feedback to the second wireless device, the precoding feedback including at least a difference between the amplitude of the reference signal and the set point for a sub-band.

34. The apparatus of claim 33, further comprising:
- means for receiving one or more data from the second wireless device in the sub-band based on the precoding feedback.

35. The apparatus of claim 33, further comprising:
- means for receiving one or more data from the second wireless device in a single tap channel.

36. The apparatus of claim 33, further comprising:
- means for receiving one or more data from the second wireless device using a single tap receiver.

37. The apparatus of claim 33, wherein the set point is non-frequency selective.

38. The apparatus of claim 33, wherein the set point provides a consistent amplitude on a frequency domain.

39. The apparatus of claim 33, wherein the precoding feedback comprises one or more sub-band coefficients for flattening a channel frequency response of an occupied bandwidth in the sub-band.

40. The apparatus of claim 39, wherein the precoding feedback indicates a per sub-band flattening coefficient for multiple sub-bands.

41. The apparatus of claim 33, wherein the sub-band comprises a frequency range in Terahertz (THz) or sub-THz.

42. The apparatus of claim 33, wherein the channel flattening information is different than spectral efficiency information.

43. The apparatus of claim 33, wherein the first wireless device is a user equipment and the second wireless device is a base station.

44. A non-transitory computer-readable medium storing computer executable code for wireless communication of a first wireless device, the code when executed by a processor cause the processor to:
- receive a reference signal from a second wireless device;
- measure amplitude and phase of the reference signal relative to a set point; and
- transmit channel flattening information in a precoding feedback to the second wireless device, the precoding feedback including at least a difference between the amplitude of the reference signal and the set point for a sub-band.

45. An apparatus for wireless communication of a first wireless device, comprising:
- a memory; and
- at least one processor coupled to the memory, the memory and the at least one processor configured to:
  - transmit a reference signal to a second wireless device;
  - receive channel flattening information in a precoding feedback from the second wireless device, the precoding feedback including at least a difference between an amplitude of the reference signal and a set point for a sub-band;
  - apply the precoding feedback to a signal for transmitting one or more data to the second wireless device; and
  - transmit the one or more data to the second wireless device.

46. The apparatus of claim 45, wherein the set point is non-frequency selective.

47. The apparatus of claim 45, wherein the set point provides a consistent amplitude on a frequency domain.

48. The apparatus of claim 45, wherein in configuring to apply the precoding feedback to the signal for transmitting the one or more data to the second wireless device the memory and the at least one processor are further configured to:
- apply at least one of an attenuation or a compensation to the signal based on the precoding feedback.

49. The apparatus of claim 45, wherein the precoding feedback comprises one or more sub-band coefficients for flattening a channel frequency response of an occupied bandwidth in the sub-band.

50. The apparatus of claim 49, wherein the precoding feedback indicates a per sub-band flattening coefficient for multiple sub-bands.

51. The apparatus of claim 45, wherein the sub-band comprises a frequency range in Terahertz (THz) or sub-THz.

52. The apparatus of claim 45, wherein the one or more data is transmitted in a single tap channel.

53. The apparatus of claim 45, wherein the channel flattening information is different than spectral efficiency information.

54. The apparatus of claim 45, wherein the first wireless device is a base station and the second wireless device is a user equipment.

55. An apparatus for wireless communication of a first wireless device, comprising:
means for transmitting a reference signal to a second wireless device;
means for receiving channel flattening information in a precoding feedback from the second wireless device, the precoding feedback including at least a difference between an amplitude of the reference signal and a set point for a sub-band;
means for applying the precoding feedback to a signal for transmitting one or more data to the second wireless device; and
means for transmitting the one or more data to the second wireless device.

56. The apparatus of claim 55, wherein the set point is non-frequency selective.

57. The apparatus of claim 55, wherein the set point provides a consistent amplitude on a frequency domain.

58. The apparatus of claim 55, wherein the means for applying the precoding feedback to the signal for transmitting the one or more data to the second wireless device comprises:
means for applying at least one of an attenuation or a compensation to the signal based on the precoding feedback.

59. The apparatus of claim 55, wherein the precoding feedback comprises one or more sub-band coefficients for flattening a channel frequency response of an occupied bandwidth in the sub-band.

60. The apparatus of claim 59, wherein the precoding feedback indicates a per sub-band flattening coefficient for multiple sub-bands.

61. The apparatus of claim 55, wherein the sub-band comprises a frequency range in Terahertz (THz) or sub-THz.

62. The apparatus of claim 55, wherein the one or more data is transmitted in a single tap channel.

63. The apparatus of claim 55, wherein the channel flattening information is different than spectral efficiency information.

64. The apparatus of claim 55, wherein the first wireless device is a base station and the second wireless device is a user equipment.

65. A non-transitory computer-readable medium storing computer executable code for wireless communication of a first wireless device, the code when executed by a processor cause the processor to:
transmit a reference signal to a second wireless device;
receive channel flattening information in a precoding feedback from the second wireless device, the precoding feedback including at least a difference between an amplitude of the reference signal and a set point for a sub-band;
apply the precoding feedback to a signal for transmitting one or more data to the second wireless device; and
transmit the one or more data to the second wireless device.

66. An apparatus for wireless communication at a first wireless device, comprising:
a memory; and
at least one processor coupled to the memory, the memory and the at least one processor configured to:
receive a reference signal from a secnd wireless device;
measure amplitude and phase of the reference signal relative to a set point; and
transmit channel flattening information in a precoding feedback to the second wireless device.

67. The apparatus of claim 66, wherein the precoding feedback includes at least a difference between the amplitude of the reference signal and the set point for a sub-band.

68. The apparatus of claim 67, wherein the memory and the at least one processor are further configured to:
receive one or more data from the second wireless device in the sub-band based on the precoding feedback.

69. The apparatus of claim 67, wherein the precoding feedback comprises one or more sub-band coefficients for flattening a channel frequency response of an occupied bandwidth in the sub-band.

70. The apparatus of claim 66, wherein the memory and the at least one processor are further configured to:
receive one or more data from the second wireless device in a single tap channel or using a single tap receiver.

71. The apparatus of claim 66, wherein the set point is non-frequency selective and provides a consistent amplitude on a frequency domain.

72. The apparatus of claim 66, wherein the channel flattening information is different than spectral efficiency information.

73. An apparatus for wireless communication at a first wireless device, comprising:
a memory; and
at least one processor coupled to the memory, the memory and the at least one processor configured to:
transmit a reference signal to a second wireless device;
receive channel flattening information in a precoding feedback from the second wireless device;
apply the precoding feedback to a signal for transmitting one or more data to the second wireless device; and
transmit the one or more data to the second wireless device.

74. The apparatus of claim 73, wherein the precoding feedback includes at least a difference between an amplitude of the reference signal and a set point for a sub-band.

75. The apparatus of claim 74, wherein the set point is non-frequency selective and provides a consistent amplitude on a frequency domain.

76. The apparatus of claim 74, wherein the precoding feedback comprises one or more sub-band coefficients for flattening a channel frequency response of an occupied bandwidth in the sub-band.

77. The apparatus of claim 73, wherein in configuring to apply the precoding feedback to the signal for transmitting the one or more data to the second wireless device, the memory and the at least one processor are further configured to:
apply at least one of an attenuation or a compensation to the signal based on the precoding feedback.

78. The apparatus of claim 73, wherein the one or more data is transmitted in a single tap channel.

79. The apparatus of claim 73, wherein the channel flattening information is different than spectral efficiency information.

* * * * *